(12) United States Patent
Leatherbury et al.

(10) Patent No.: US 6,891,841 B2
(45) Date of Patent: May 10, 2005

(54) TIME DIVISION MULTIPLE ACCESS OVER BROADBAND MODULATION METHOD AND APPARATUS

(75) Inventors: Ryan M. Leatherbury, Austin, TX (US); Robert E. Johnson, Austin, TX (US); Jason A. Beens, San Antonio, TX (US)

(73) Assignee: Advent Networks, Inc., Austin, TX (US)

(*) Notice: Subject to any disclaimer, the term of this patent is extended or adjusted under 35 U.S.C. 154(b) by 534 days.

(21) Appl. No.: 10/137,326

(22) Filed: May 3, 2002

(65) Prior Publication Data

US 2002/0136231 A1 Sep. 26, 2002

Related U.S. Application Data

(63) Continuation-in-part of application No. 09/804,104, filed on Mar. 12, 2001, now Pat. No. 6,763,025.
(60) Provisional application No. 60/288,740, filed on May 4, 2001.

(51) Int. Cl.[7] .......................... H04J 14/08; H04L 12/66; H04N 7/173
(52) U.S. Cl. ...................... 370/401; 370/420; 370/442; 398/58; 398/74; 725/109; 725/119; 725/129
(58) Field of Search .................................. 370/337, 338, 370/347, 349, 350, 351, 352, 389, 392, 395.1, 395.6, 395.64, 400, 401, 419, 420, 442, 458, 463, 465, 466, 467; 398/43, 45, 46, 48, 49, 52, 54, 58, 74, 98; 709/230, 238, 246, 247, 249, 250; 725/109, 110, 111, 114, 116, 118, 119, 129

(56) References Cited

U.S. PATENT DOCUMENTS 4,533,948 A 8/1985 McNamara et al.
5,526,034 A 6/1996 Hoarty et al.
5,544,161 A 8/1996 Bigham et al.
5,557,316 A 9/1996 Hoarty et al.
5,648,958 A 7/1997 Counterman (Continued)

FOREIGN PATENT DOCUMENTS

| EP | 0730383 | 9/1996 |
|---|---|---|
| EP | 1 079 553 A2 | 9/2001 |
| EP | 1 130 841 A1 | 9/2001 |
| WO | WO 00/52880 | 9/2000 |
| WO | WO 01/99342 A2 | 12/2001 |

*Primary Examiner*—Alpus H. Hsu
(74) *Attorney, Agent, or Firm*—Craig J. Yudell, Esq.; Dillon & Yudell, LLP

(57) ABSTRACT

A communication system is disclosed for providing dedicated bandwidth to at least one subscriber location for transmitting to a common point of distribution via an HFC network. In an embodiment of the invention, the communication system includes a channel interface module and at least one gateway coupled across the HFC network. The channel interface module is located at the point of distribution and includes a transmitter that transmits a windowing signal via the HFC network. The gateway is located at a subscriber location and includes a processor that encapsulates subscriber data into data cells suitable for burst transmission, receive logic that receives the windowing signal, timing logic that indicates burst transmission times only at programmed time slots within each of repeating transmission windows based on the windowing signal and a predetermined transmission timing offset, and a burst transmitter that burst transmits subscriber data cells in a predetermined upstream frequency channel when indicated by the timing logic.

31 Claims, 9 Drawing Sheets

U.S. PATENT DOCUMENTS

| | | |
|---|---|---|
| 5,666,358 A | 9/1997 | Paratore et al. |
| 5,666,487 A | 9/1997 | Goodman et al. |
| 5,680,388 A | 10/1997 | Kahre |
| 5,684,799 A | 11/1997 | Bigham et al. |
| 5,696,765 A | 12/1997 | Safadi |
| 5,708,961 A | 1/1998 | Hylton et al. |
| 5,740,075 A | 4/1998 | Bigham et al. |
| 5,742,713 A | 4/1998 | Sanders et al. |
| 5,745,837 A | 4/1998 | Fuhrmann |
| 5,808,767 A | 9/1998 | Williams et al. |
| 5,812,786 A | 9/1998 | Seazholtz et al. |
| 5,822,324 A | 10/1998 | Kostresti et al. |
| 5,847,751 A | 12/1998 | Safadi |
| 5,889,765 A | 3/1999 | Gibbs |
| 5,896,382 A | 4/1999 | Davis et al. |
| 5,926,476 A | 7/1999 | Ghaibeh |
| 5,963,561 A | 10/1999 | Lu |
| 5,991,308 A | 11/1999 | Fuhrmann et al. |
| 6,041,051 A | 3/2000 | Doshi et al. |
| 6,285,681 B1 | 9/2001 | Kolze et al. |
| 6,307,868 B1 | 10/2001 | Rakib et al. |
| 6,356,555 B1 | 3/2002 | Rakib et al. |
| 6,366,585 B1 | 4/2002 | Dapper et al. |
| 6,459,703 B1 | 10/2002 | Grimwood et al. |
| 6,490,727 B1 | 12/2002 | Nazarathy et al. |
| 6,507,592 B1 | 1/2003 | Hurvig et al. |
| 6,507,872 B1 | 1/2003 | Geshwind |
| 6,539,003 B1 | 3/2003 | Agarwal et al. |
| 6,765,931 B1 * | 7/2004 | Rabenko et al. ............ 370/493 |
| 6,816,512 B2 * | 11/2004 | Lazarus et al. ............. 370/535 |

* cited by examiner

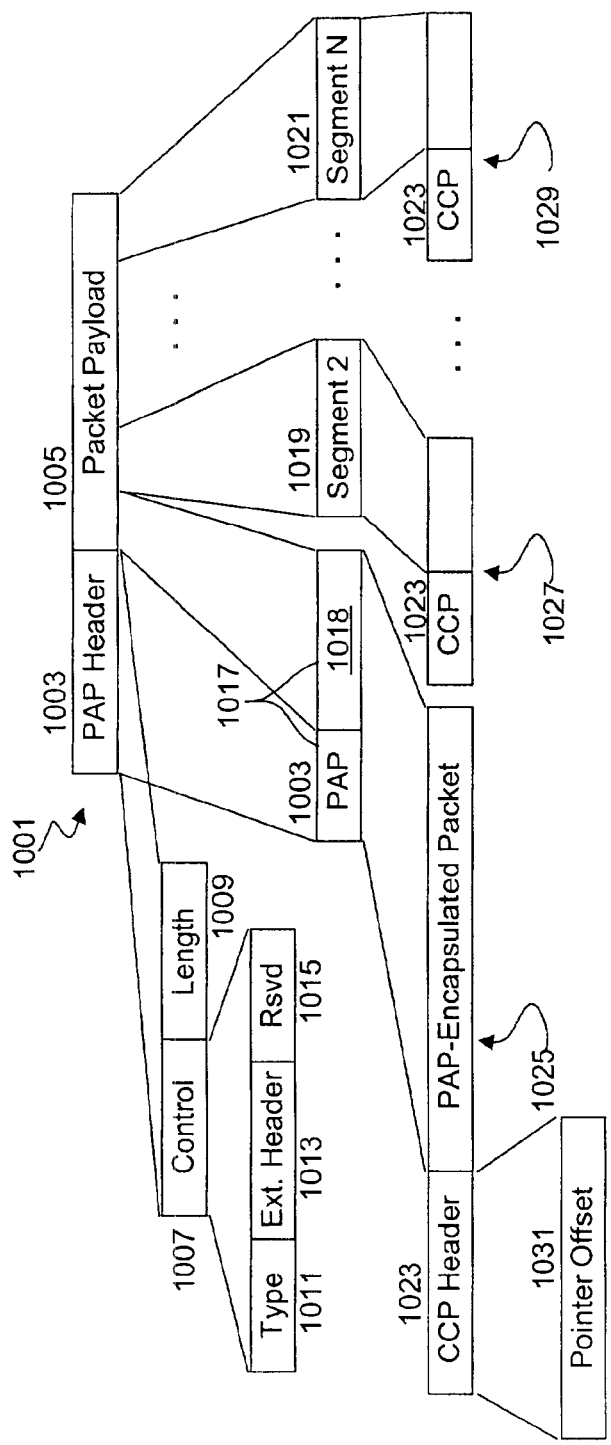
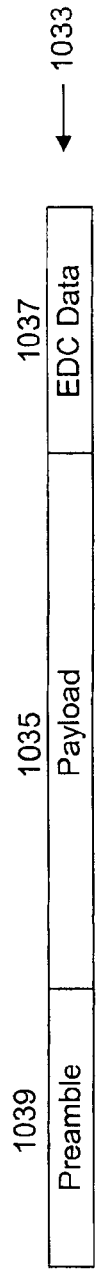
FIG. 10A
FIG. 10B

TIME DIVISION MULTIPLE ACCESS OVER BROADBAND MODULATION METHOD AND APPARATUS

CROSS-REFERENCE TO RELATED APPLICATIONS

The present application claims priority to U.S. Provisional Patent Application 60/288,740 filed on May 4, 2001, entitled "Time Division Multiple Access Over Broadband Modulation Method and Apparatus," and is a continuation-in-part (CIP) of U.S. patent application Ser. No. 09/804,104 filed on Mar. 12, 2001, now U.S. Pat. No. 6,763,025, entitled "Time Division Multiplexing Over Broadband Modulation Method And Apparatus," both of which are hereby incorporated by reference in their entirety.

BACKGROUND OF THE INVENTION

1. Field of the Invention

The present invention relates to information delivery and distribution, and more particularly, to a time division multiple access over broadband modulation method and apparatus that provides subscribers with allocated, unshared and deterministic bandwidth for upstream communications.

2. Description of Related Art

The demand for broadband content by business and residential subscribers is continually increasing. Broadband content includes multiple types of entertainment programming, communications and data, such as, broadcast television channels, video-on-demand, streaming video, multimedia data, Internet access, packet telephony, etc. To meet the increasing demand, it is typically necessary to increase bandwidth to each subscriber and to improve quality of service. Current delivery technologies include several variations of DSL (digital subscriber line) technology, such as ADSL (asymmetrical DSL) and the like, which uses telephony technology; cable modem systems using television technology and HFC (hybrid fiber coax) distribution networks; and 2-way wireless local loop (WLL) networks, including 2-way satellite services. However, existing technology for providing broadband content is becoming increasingly inadequate to meet the demand.

DSL technology is a method of delivering data over a twisted pair of copper wires or twisted pair cables, and typically uses public switched telephone networks (PSTN). There are several major problems with provisioning video services over the existing PSTN and twisted pair cables (network plant). For example, the existing network plant is not uniform and most of the plant is old with poor copper conditions that cause signal loss and line noise. In fact, ADSL cannot be provisioned for a large portion of the population over the existing plant because of significant distances to the closest DSL Access Multiplexor (DSLAM) and poor conditions of the existing plants. In addition, ADSL currently has a limited downstream bandwidth, and inherently provides a very limited return bandwidth. ADSL is not adequate for many types of content originating at a subscriber location, such as video conferencing and the like because of its bandwidth limitations and characteristics.

Cable modem systems for the delivery of data services using Data-Over-Cable Service Interface Specifications (DOCSIS) utilize the television broadcast spectrum and television technology to broadcast so-called broadband data to subscribers. One problem with delivery of broadband data using existing HFC networks is the limitation on available delivery spectrum. Television data delivery systems have been established to deliver data to subscribers over a television broadcast spectrum extending from approximately 15 Megahertz (MHz) to approximately 860 MHz. Delivery of analog television downstream to the subscriber occupies the spectrum between approximately 54 MHz to 550 MHz, which leaves a relatively small range of spectrum for the delivery of digital information over HFC cable modem systems. A diplex filter separating the downstream from the upstream is located within the frequency range of approximately 42 to 54 MHz in an extended sub-split frequency plan, which is common for consumer-based HFC systems. Therefore, the two effective delivery frequency ranges using typical consumer-based HFC systems are those between approximately 15–42 MHz (upstream) and those between approximately 550–860 MHz (downstream).

DOCSIS is a standard that specifies a methodology for delivering data services over an HFC plant. DOCSIS defines a Cable Modem Termination System (CMTS), which is an entity used to deliver data services over an HFC network from a central distribution point. These systems employ a shared frequency channel to broadcast all data to every downstream subscriber. The shared channel is generally 6 MHz wide providing a total data bandwidth of approximately 27–38 megabits per second (Mbps) for digital information. The channel, however, is shared among many subscribers, so that the data rate varies dramatically depending upon the time of use and the number of subscribers simultaneously logged on. The quality of service is particularly low during popular usage time periods. Moreover, conventional systems typically distribute the shared channel among at least four (4) separate nodes, each serving approximately 500 subscribers or more, so that resulting downstream data rate is often relatively low. The upstream shared channel is usually smaller, such as 3.2 MHz or less, and a "poll and grant" system is employed to identify data for upstream transmission. The resulting upstream performance is often no better (and sometimes less) than a standard 56 Kbps modem.

SUMMARY OF THE INVENTION

The present invention overcomes these and other deficiencies of the related art by providing a system and method for distributing information via existing and future communication networks that meets the increasing demand for broadband content. Particularly, the invention is directed toward a time division multiple access (TDMA) over broadband frequency modulation method and system for providing dedicated bandwidth to each of a plurality of subscriber locations transmitting to a common point of distribution via a hybrid fiber coax (HFC) network.

In an embodiment of the invention, a method includes transmitting a windowing signal from a point of distribution to each of a plurality subscriber locations. Each subscriber location encapsulates subscriber data into data cells, wherein each data cell is suitable for a burst transmission within a time slot of predetermined duration. The relative timing of each of a predetermined number of time slots within each of repeating transmission windows is determined based on the windowing signal and a predetermined transmission offset value. Subscriber data cells within programmed time slots are burst transmitted to the point of distribution.

Windowing signal transmission can comprise repeatedly transmitting a synchronization mark indicating a beginning of each transmission window. The step of determining relative timing may include determining a receive time upon receiving a synchronization mark, adding the transmission offset value to the receive time to identify a beginning time of a first time slot, and adding a predetermined time slot duration value to identify a beginning time of each subsequent time slot in each transmission window. The method may further include determining an end time of each transmission window based on a predetermined round robin duration value. Also, the method may include shifting a slot number bit field for each time slot within each transmission window, and comparing the slot number bit field with a predetermined slot mask field for each time slot to determine if burst transmission is allowed in that time slot. In an alternative embodiment, transmitting a windowing signal includes formulating downstream data into a stream of data cells, inserting synchronization marks into selected data cells of the stream of data cells, and transmitting the stream of data cells to the subscriber locations in continuous mode.

The step of encapsulating subscriber data into data cells may include segmenting subscriber data into data segments, framing each data segment into fixed-size frames, and encapsulating fixed-size frames into data cells. Also, the method may include affixing a predetermined preamble to each data cell. In one embodiment, the upstream burst receiver uses the known preamble to measure channel characteristics and determines the effect of the channel characteristics on upstream communications to more accurately resolve burst communications.

The method may further include measuring a propagation delay between the point of distribution and each subscriber location, calculating a transmission offset value for each subscriber location, and sending a corresponding transmission offset value to each subscriber location. The transmission offset value compensates for propagation delay differential between the subscriber locations to synchronize upstream burst transmissions. The duration of each time slot may be predetermined and may be based on an amount of time to burst transmit an upstream codeword and a predetermined guard band between each codeword. Alternatively, the point of distribution may determine quality of the channel and adjust upstream timing, such as adjusting the size of the guard bands to ensure robust communications. The method, for example, may further include determining a time slot duration value, and sending the time slot duration value to each subscriber location. Further, the method may include assigning at least one time slot to each subscriber location on a mutually-exclusive basis, and programming each subscriber location with a time slot assignment value.

In yet another embodiment, a method of providing dedicated bandwidth to a subscriber location for transmitting to a point of distribution includes determining a propagation delay between the point of distribution and the subscriber location, programming the subscriber location with a window timing offset based on the determined propagation delay, programming the subscriber location with a subset of a predetermined number of time slots of repeating transmission windows of a frequency channel, repeatedly transmitting a window synchronization signal to the subscriber location, calculating a start time of a first time slot of each transmission window, determining a start time of each remaining time slot of each transmission window relative to the first time slot, and burst transmitting from the subscriber location only during a programmed subset of time slots of each transmission window. The window synchronization signal indicates timing of the repeating transmission windows of the frequency channel. The start time of a first time slot of each transmission window is based on when each window synchronization signal is received and the window timing offset.

The step of determining a propagation delay may include transmitting a hello message from the point of distribution to the subscriber location at a determinable time. In one embodiment, for example, a hello message is repeatedly transmitted during at least one predetermined time slot in each downstream transmission window of a predetermined downstream frequency channel. The method includes transmitting a response from the subscriber location to the point of distribution upon detection of the hello message, and detecting time of reception of the response by the point of distribution. The method may further include determining a start time for each transmission window relative to the point of distribution. In this manner, the start time is the same for several subscriber locations in the same upstream frequency channel. In this case, the method further includes calculating a time differential between the transmission window start time and a reception time of the window synchronization signal at the subscriber location, and determining the window timing offset based on the calculated time differential. The method may further include determining a number of time slots per transmission window, determining transmission duration of each time slot including transmission time of a subscriber location burst and a suitable guard band duration, and determining duration of each transmission window for transmitting the determined number of time slots including intermediate guard bands.

The method may further include inserting a synchronization mark into selected codewords at the point of distribution so that each codeword with a synchronization mark is separated by a predetermined number of codewords without a synchronization mark, and transmitting the codewords by the point of distribution in continuous mode. The step of calculating a start time of a first time slot may include determining a receive time of each window synchronization signal and adding the window timing offset to the receive time. The method may further include determining a time slot duration value indicative of the duration of each time slot and programming the subscriber location with the time slot duration value. The step of determining a start time of each remaining time slot may include adding the time slot duration value to a start time of a previous time slot start time beginning with the start time of a first time slot.

A communication system for providing dedicated bandwidth to at least one subscriber location for transmitting to a common point of distribution via an HFC network according to an embodiment of the invention comprises a channel interface module and at least one gateway coupled across the HFC network. The channel interface module is located at the point of distribution and includes a transmitter that transmits a windowing signal via the HFC network. The gateway is located at a subscriber location and includes a packet processor that encapsulates subscriber data into data cells suitable for burst transmission, receive logic that receives the windowing signal, timing logic that indicates burst transmission times only at programmed time slots within each of repeating transmission windows based on the windowing signal and a predetermined transmission timing offset, and a burst transmitter that burst transmits subscriber data cells in a predetermined upstream frequency channel when indicated by the timing logic. The packet processor may be embodied in, for example, a general purpose processor, network processor, field-programmable gate array (FPGA), or application specific integrated circuit (ASIC).

The channel interface module of the communication system may further include a burst receiver that detects burst transmissions from the gateway within a predetermined frequency channel and a controller configured to conduct an initialization process for the gateway. The initialization process includes instructing the transmitter to send hello messages in at least one predetermined time slot of a downstream frequency channel, periodically silencing the predetermined upstream frequency channel, detecting a burst response from the gateway in the predetermined upstream frequency channel and determining a propagation delay to the gateway. The controller may further be configured to program the gateway with the transmission timing offset, a slot duration value and with a time slot assignment value. The transmitter of the channel interface module may further include a data processing engine that encapsulates downstream data into data cells, an encoder that encodes data cells into codewords, and a modulator that modulates the codewords in continuous mode. The transmitter of the channel interface module may further be configured to insert a synchronization mark into selected codewords to transmit a periodic windowing signal. The timing logic of the gateway may include a memory that stores a transmission timing offset value, a time slot assignment value, and a slot duration value. The timing logic of the gateway may further be configured to detect a synchronization mark, to add the transmission timing offset value to determine the start time of a first slot of each transmission window, to add the slot duration value to determine the start time of each subsequent slot of each transmission window, and to compare the time slot assignment value with each current slot to determine if burst transmission is allowed. The memory of the gateway timing logic may further store a transmission window duration value. The gateway processor may further be configured to segment subscriber data into data segments, to frame the data segments into frames and to encapsulate the frames into the data cells suitable for burst transmission.

The invention also discloses a gateway configured to provide dedicated upstream bandwidth for transmitting to a point of distribution via an HFC network. The point of distribution transmits a periodic synchronization signal to the gateway via the HFC within a predetermined downstream frequency channel. The gateway includes a diplexer for coupling to the HFC, receiver that is tuned to the predetermined downstream frequency channel to receive communications from the point of distribution, frame logic configured to resolve downstream transmitted codewords, a communications processor configured to convert subscriber data into data cells suitable for burst transmission, a burst transmitter configured to burst transmit a data cell from the communications processor within a predetermined time slot of a predetermined upstream frequency channel upon receiving a transmit signal, timing logic configured to detect the periodic synchronization signal from downstream codewords, to determine a start time for each time slot within the predetermined upstream frequency channel based on the synchronization signal, a timing offset value and a slot duration value, and to assert the transmit signal for each time slot indicated by a time slot assignment value, and an RF circuit that communicates burst transmissions to the point of distribution via the diplexer and the HFC network.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIG. 10A is a block diagram illustrating exemplary packet encapsulation for upstream transmission performed by the communications processor of FIG. 8; and FIG. 10B is a block diagram of an upstream frame illustrating an exemplary upstream frame format.

DETAILED DESCRIPTION OF THE PREFERRED EMBODIMENTS

Figure 1:
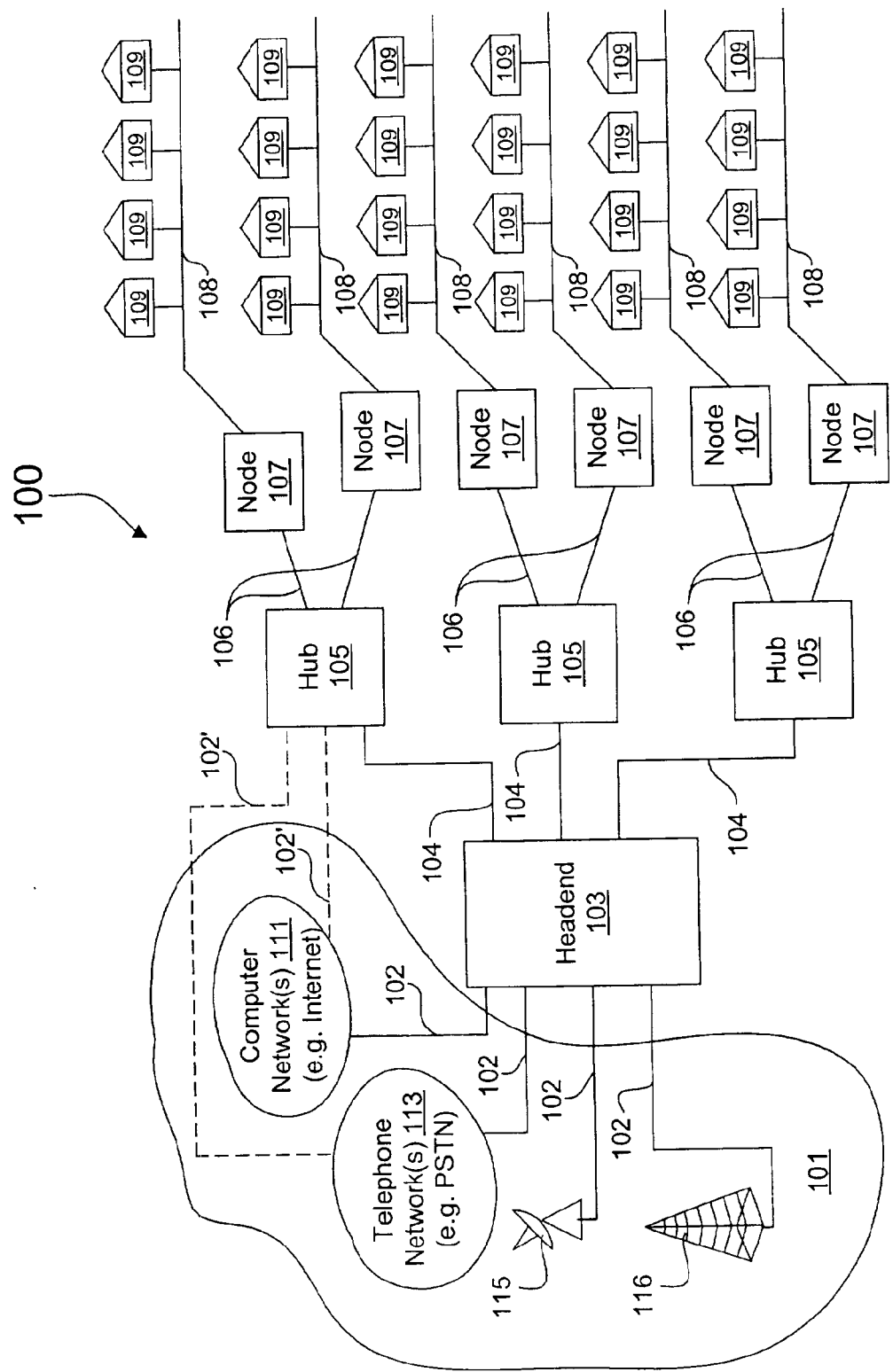
FIG. 1 is a block diagram of communication network architecture according to an embodiment of the invention.

Preferred embodiments of the present invention and their advantages may be understood by referring to FIGS. 1–10, wherein like reference numerals refer to like elements, and are described in the context of an information distribution system employing a hybrid fiber coax network. Nevertheless, the inventive concept can be adapted to an optical fiber network, coax cable network, or a wireless network, or any combination thereof.

FIG. 1 is a block diagram of an exemplary communication system 100 with exemplary network architecture. One or more sources 101 are coupled via appropriate communication links 102 to deliver source information to a headend 103, which distributes the source information to one or more distribution hubs 105 via respective communication links 104. Each distribution hub 105 further distributes source information to one or more nodes 107 via communication links 106, where each node 107 in turn distributes the source information to one or more subscriber locations 109 via subscriber links 108. In the embodiment shown, bi-directional communication is supported in which upstream subscriber information from any one or more of the subscriber locations 109 is delivered to the corresponding distribution hub 105 via the corresponding subscriber links 108. Depending upon the nature of the subscriber information and the network architecture, the subscriber information may be delivered to the headend 103, or to an appropriate source 101, by the corresponding distribution hub 105. Again, depending upon the nature of the subscriber information and the network architecture, the subscriber information may be further delivered to an appropriate source 101 by the headend 103.

It is noted that the headend 103, the distribution hubs 105, and the nodes 107, may generically be referred to as points of distribution for source and subscriber information. Each point of distribution supports a successively smaller geographic area. The headend 103, for example, may support a relatively large geographic area, such as an entire metropolitan area or the like, which is further divided into smaller areas, each supported by a distribution hub 105. The areas supported by each distribution hub 105 is further divided into smaller areas, such as neighborhoods within the metropolitan area, each supported by a corresponding node 107.

Many different types of sources 101 can be implemented, such as, but not limited to one or more computer or data networks 111, one or more telephone networks 113, one or more satellite communication systems 115, one or more off-air antenna systems 116 (e.g. microwave tower). The computer networks 111 may include any type of local, wide area or global computer networks, such as the Internet. The telephone networks 113 may include the public switched telephone network (PSTN), cellular network, or any other public or private telephone network. The satellite communication systems 115 and/or the antenna systems 116 may be employed for reception and delivery of any type of information, such as television broadcast content or the like. The headend 103 may also include video on demand (VOD) equipment (not shown). In an alternative embodiment of the invention, depending upon the network architecture, any one or more of the sources 101 may be coupled directly to one or more of the distribution hubs 105, in the alternative, or in addition to being coupled to the headend 103, as illustrated by communication links 102'. For example, one or more of the computer networks 111 and the telephone networks 113 are shown coupled to a distribution hub 105. The headend 103 includes appropriate equipment for data transmission, such as, for example, internal servers, firewalls, IP routers, signal combiners, channel re-mappers, etc.

Each of the communication links (102, 102', 104, 106, 108) may employ any appropriate type of medium, such as electrical cable, fiber optic cables, wireless, or the like, or any combination thereof. For example, in one embodiment, each of the communication links 102 and 102' includes optical media for communicating data and information, such as between the headend 103 and a satellite communication system 115 and/or an antenna system 116, and/or 1000Base-X ethernet for communicating digital information between the headend 103 and any computer or telephony network 111, 113. In a preferred embodiment of the invention, the communication links 106 comprise optical fibers or cables that are distributed between each node 107 and a corresponding distribution hub 105. The network architecture employs a hybrid fiber coax (HFC) distribution network in which the subscriber links 108 comprises coaxial cables that are distributed from each node 107 to the respective subscriber locations 109. In this configuration, the nodes 107 convert the signal between optical and electrical formats. The communication links 104 may also comprise optical links, such as, for example, synchronous optical network (SONET) links or the like. Nevertheless, it is understood by one of skill in the art that any known or future developed media can be implemented for each communication link. In an HFC embodiment, for example, each node 107 receives an optical signal from an upstream point of distribution, converts the optical signal to a combined electrical signal and distributes the combined electrical signal over a coaxial cable to each of several subscriber locations 109 of a corresponding geographic serving area. Subscriber information is forwarded in electrical format and combined at each node 107, which forwards a combined optical signal upstream to a corresponding one of distribution hubs 105 via one of communication links 106.

Each subscriber location 109 includes customer premises equipment (CPE), which further includes a subscriber gateway 801 (FIG. 8), which separates upstream and downstream information, tunes, de-modulates, decodes, and selects source information from the combined electrical signal addressed or otherwise intended for the particular subscriber location 109. The gateway 801 may be incorporated within, or otherwise coupled to other subscriber devices, such as set-top boxes, cable modems, etc. The gateway 801 at each subscriber location 109 includes a modulating device, or the like, that encodes, modulates and up-converts subscriber information into RF signals. The gateway 801 at each of the subscriber locations 109 combines the upstream RF signals onto the subscriber link 108 and delivers them to a corresponding node 107. A separate upstream channel of the upstream portion of the cable spectrum used for upstream communications in the cable return path may be assigned to each of the subscriber destinations 109 to prevent interference with downstream communications. The upstream RF signals are provided to node 107, which includes an upstream optical transceiver or the like that converts the subscriber RF signals to an optical signal. For example, node 107 may comprise a laser to convert the return signal to an optical signal for transmission to an optical receiver at the distribution hub 105.

The source and subscriber information may include any combination of video, audio, or other data signals and the like, which may be in any of many different formats. The source information may originate as fixed- or variable-size frames, packets or cells, such as internet protocol (IP) packets, ethernet frames, asynchronous transfer mode (ATM) cells, etc., as provided to the distribution hubs 105. Any such type of digital information in fixed- or variable-sized frames, packets or cells is referred to herein as "packetized" data. The packetized data includes one or more destination addresses or the like indicating any one or more specific subscriber devices at the subscriber locations 109. In an exemplary embodiment of the distribution hubs 105 as described herein, the packetized data is converted and delivered to the subscriber locations 109 employing time division multiplexing (TDM) over broadband modulation, thereby enabling the delivery of allocated, unshared and deterministic bandwidth to the subscribers in the communication system 100. The gateway 801 at each subscriber location 109 includes the appropriate communication equipment to tune, demodulate and decode the TDM over broadband information to deliver the original content to one or more subscriber devices. Upstream subscriber packetized data is converted to frames or codewords in a similar manner. The upstream data is transmitted in bursts using a time division multiple access (TDMA) over frequency division multiple access (FDMA) scheme as further described herein.

It is noted that many different modulating frequencies and techniques can be implemented for both downstream and upstream communications. Modulation techniques may include, for example, frequency shift keying (FSK), quadrature phase-shift keying (QPSK), as well various types of quadrature amplitude modulation (QAM), such as QAM 16, QAM 64, QAM 256, etc., among other modulation techniques. Also, each frequency channel may have any predetermined bandwidth, such as 1 MHz, 3 MHz, 6 MHz, 12 MHz, etc. Each subscriber channel typically includes a separate downstream and upstream channel separated in frequency, where the corresponding downstream and up stream channels may have the same or different channel width. Further, the modulation technique employed for each downstream channel may be the same or different than the modulation technique employed for each upstream channel.

In one embodiment, the communication system 100 is an HFC system that supports analog television broadcast transmission in which broadcast television channels are allocated to a particular frequency range of the overall available RF cable television spectrum (5 MHz-1 GHz). The remaining portion of the RF cable television spectrum is utilized to assign data channels including any combination of downstream and upstream channels. For example, some HFC systems implement an extended sub-split frequency plan with a return band, which extends from 5 to 42 MHz, and a forward band, which extends from 52 to 750–860 MHz. It is understood that the particular frequency ranges described herein are exemplary only and that any frequency allocation scheme may be employed depending upon the desired configuration. In an exemplary embodiment, the particular HFC network operator segments the entire forward band into 6 MHz channels according to the channelization plan implemented. For typical HFC plants supporting analog television broadcasts, 80 analog channels are transmitted in the forward band between 53 and 550 MHz. In such HFC networks, satellite signals and local analog stations are mapped to 6 MHz broadcast channels within the forward band at the headend 103. Each 6 MHz forward band channel may contain an analog channel or multiple digital channels that are MPEG encoded. Each 6 MHz channel is up-converted to a frequency within the forward band according to the appropriate channel path.

The return band (5–42 MHz) and the remaining forward band spectrum, including frequency ranges 550 to 750–860 MHz, is allocated to subscriber digital channels and/or data transmission for dedicated bandwidth to each subscriber location 109. For example, the frequency range 550 to 860 MHz is allocated for downstream channels and the frequency range 5 to 42 MHz is allocated for upstream channels. The frequency range 42–54 MHz is the location of a diplex filter that separates the downstream communications from the upstream communications. Diplex filters allow for bi-directional communication over the shared HFC fiber and coaxial medium using frequency division multiplexing (FDM). The basic diplex filter consists of a high pass and a low pass filter in parallel followed by an amplifier that are both driven from the same source.

In alternative embodiments of the communication system 100, such as an all-digital HFC system, a substantial portion or the entire available spectrum is utilized to assign channels to each of the subscribers. In an all-digital HFC network, for example, there is no requirement for broadcast transmission of analog channels over the same frequencies used to transmit broadcast channels using off-air frequencies (i.e., channel 2 at 54 MHz in accordance with the harmonically related carrier (HRC) frequency plan). As a result, the filter frequency settings on the diplex filter in an all-digital network allows increased spectrum allocation for upstream communications. For instance, mid-split and high-split frequency plans, which are suitable for an all-digital network, allocate the 5–86 MHz and 5–186 MHz ranges, respectively, for upstream transmission. Consequently, all-digital networks allow more upstream bandwidth for interactive services, such as data over cable services, packet telephony, video conferencing, interactive gaming, etc. In these all-digital embodiments, the relatively large bandwidth otherwise consumed by television broadcast information is available for channel assignments. This provides a significant advantage since a very "clean" portion of the RF spectrum (e.g., 50–300 MHz) may be employed for data communication. Each user may be allocated a greater amount of bandwidth or a greater number of subscribers may be served for each coaxial cable. A different frequency spectrum split may be utilized to increase upstream bandwidth availability, and enables a symmetrical configuration with equal downstream and upstream bandwidth allotments. Embodiments with a smaller geographical serving area relatively provide less noise so that each subscriber location 109 receives a cleaner signal, typically without the need for amplification.

One significant benefit of the embodiments of the communication system 100 described herein is the ability to deliver allocated, unshared and deterministic bandwidth to individual subscribers. Therefore, data destined for a particular subscriber location 109 is assigned a specific and unshared bandwidth that is available only to that subscriber. This provides the ability to deliver time-dependent or isochronous type services to each subscriber location 109, such as video, voice over IP, streaming media, bi-directional audio content (e.g., a telephone connection), etc. at a quality of service that is not otherwise possible in a conventional network in which data over cable delivery methodologies that use contention- or arbitration-based bandwidth allocation schemes are implemented. Bandwidth allocation can be controlled by a bandwidth manager or the like at each distribution hub 105. The bandwidth manage allocates each subscriber location 109 unshared and deterministic bandwidth in both upstream and downstream directions.

Figure 2:
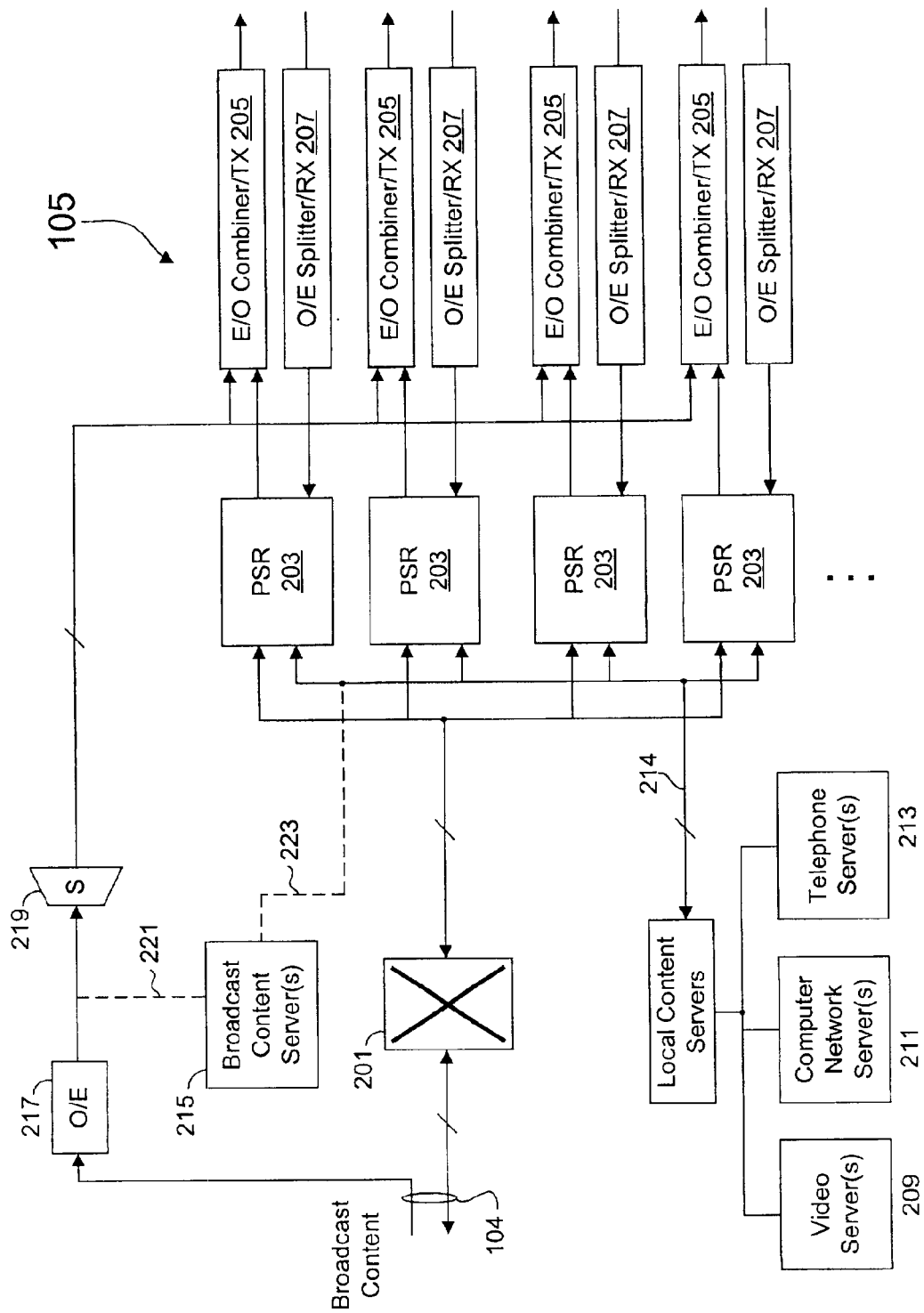
FIG. 2 is a block diagram of a distribution hub according to an embodiment of the invention.

FIG. 2 is a simplified block diagram of an exemplary embodiment of any one or more of the distribution hubs 105 of FIG. 1. In the embodiment shown, the distribution hub 105 includes a switch 201 that receives and forwards digital information, such as data and content, between the upstream sources via the communication link 104, such as the sources 101 and/or the headend 103, and one or more (N) packet switch routers (PSRs) 203. The switch 201 and each PSR 203 may be configured to communicate via optical media or the switch 201 may include an optical to electrical (O/E) conversion. In one embodiment, the switch 201 is an ethernet-type switch that forwards ethernet packets. Each packet includes source and destination addresses enabling the switch 201 to forward the packets from a source to the appropriate destination in both upstream and downstream directions. In a more particular embodiment, the switch 201 includes one or more switches each operating according to 100Base-X or 1000Base-X Ethernet at a data rate of 100 Mbps or 1 gigabit per second (Gbps), respectively. Each PSR 203 is interfaced with the switch 201 via separate and respective optical or electrical 100Base or 1000Base Ethernet electrical or optical links 214. It is understood by one of skill in the art, however, that the invention is not limited to any particular architecture, protocol or technology and that other network technologies may be used, such as asynchronous transfer mode (ATM) technology or the like.

As further described below, each PSR 203 encodes, modulates and up-converts source digital information received from the switch 201 into one or more downstream channels, and forwards RF signals to respective inputs of at least one of one or more RF electrical to optical (E/O) combiners and transmitters 205. Each RF channel has a predetermined frequency bandwidth, such as 6 MHz in a standard United States configuration, and thus supports a particular amount of data transmission depending upon the modulation technique employed. In a particular embodiment employing QAM-256 as the modulation technique, each 6 MHz physical channel has a data throughput capacity of approximately 40 Mbps. It is appreciated that alternative modulation techniques other than QAM-256 may be employed. The PSR 203 may be implemented in a modular and scalable format to combine multiple downstream channels into at least one combined electrical signal distributed via a single RF connector. Also, each PSR 203 may be implemented to provide multiple combined electrical signals via corresponding RF connectors, each supporting multiple downstream channels. Each combiner/TX 205 combines the RF signals from one or more combined electrical signals from one or more PSRs 203 into a single combined optical signal that is transmitted via a fiber optic cable or the like to a corresponding one of the nodes 107. It is noted that each distribution hub 105 may transmit to one or more nodes 107, each serving a different geographic serving area.

Upstream subscriber digital information is received by a corresponding one of several RF optical to electrical (O/E) receivers and splitters 207, which receives an optical signal with combined subscriber information via an optical cable, converts the combined optical signal to a combined subscriber electrical signal and splits or duplicates and forwards the combined subscriber electrical signal to corresponding one or more of the PSRs 203. It is noted that the upstream signals are typically received over diverse return paths from separate nodes. In the embodiments described herein, the upstream signals are combined to a single signal that is received by a common PSR input connector. Each PSR 203 is tuned to one or more upstream channels and extracts a corresponding return RF signal. Each PSR 203 demodulates and decodes the return RF signal into corresponding subscriber data packets for each upstream channel. The subscriber data packets are then forwarded to the switch 201 for processing and/or forwarding as necessary. It is noted that although a separate combiner/TX 205 and a separate splitter/RX 207 is shown for each PSR 203, multiple combiner/TXs 205 and splitter/RXs 207 may be provided for a single PSR 203 or multiple PSRs 203 may use a single combiner/TX 205 and/or a single splitter/RX 207 depending upon particular configurations and data capabilities of the respective devices.

The distribution hub 105 may include one or more local content servers that convert or otherwise deliver data and content between the distribution hub 105 and the subscriber locations 109 and/or upstream sources, such as the sources 101 and/or the headend 103. For example, the distribution hub 105 may include one or more video servers 209 that communicate video content, one or more computer network servers 211 that enable communication with the Internet and/or other computer networks, and one or more telephone network servers 213 that enable communication with the PSTN and/or other telephonic networks. Also, the distribution hub 105 may include one or more broadcast content servers 215 for receiving and forwarding broadcast content and information, such as television broadcast channels or the like. Such broadcast content and information may be selectively delivered within individual subscriber channels or collectively broadcast with the subscriber channels as previously described. Each of the servers 209–215 represents one or more server computers and includes any additional functionality as necessary or desired. For example, the video servers 209 may incorporate one or more video functions including video-on-demand (VoD) and may further include a moving pictures experts group (MPEG) encoder or the like that encodes broadcast video content from analog to digital or otherwise transcodes video content from one digital form to another. The telephone network servers 213 may include or otherwise incorporate one or more telephone switches or the like. The illustrated servers 209–215 are exemplary only and other types of servers and content can be implemented. Alternatively, a generic data server for exchanging information with the headend 103 may replace the servers 209–215.

In operation, broadcast content is received from an upstream source via the communication link 104 and provided to an O/E converter 217. The electrical broadcast content is then provided to a splitter 219 and distributed to respective inputs of one or more of the combiner/TXs 205. The broadcast content may be in either analog or digital format. Each combiner/TX 205 is configured to receive and combine the broadcast television information with the source information forwarded within assigned channels from one or more of the PSRs 203. In particular, each combiner/TX 205 operates to overlay the broadcast content information, such as television broadcast channels or the like, with the digital subscriber channels to develop a combined optical signal for downstream transmission. The gateway 801 at each of one or more of the subscriber locations 109 is configured to receive, split and forward the broadcast content information to an appropriate subscriber device, such as a set top box or television or the like. This embodiment of the communication system 100 is particularly applicable to consumer-based networks in which it is desired that cable television channels or the like be available directly from the subscriber medium routed to the subscriber locations 109 without the need for further conversion.

In an alternative embodiment, the electrical broadcast content is delivered to the broadcast content server 215 via alternative connection 221, where the broadcast content server 215 is coupled to one or more of the PSRs 203 via separate connections 223 in a similar manner as the other local content servers 209–213. In this manner, the broadcast content and information is selectively delivered to subscriber locations 109 via corresponding subscriber channels. This embodiment of the communication system 100 conforms to the all-digital configuration in which the entire available spectrum is available for digital communications via the subscriber channels.

Figure 3:
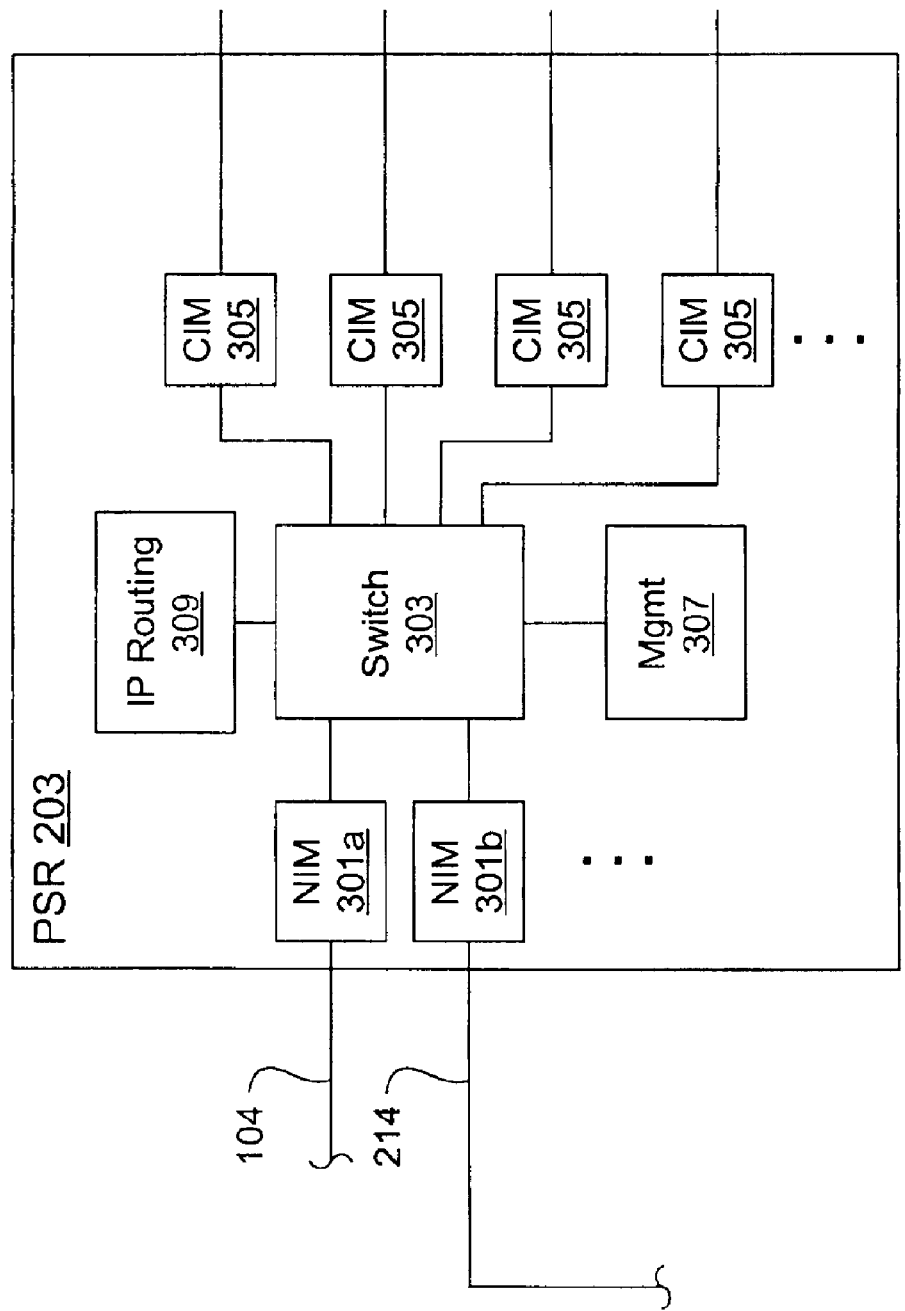
FIG. 3 is a block diagram of a packet switch router according to an embodiment of the invention.

FIG. 3 is a functional block diagram of an exemplary PSR 203 implemented according to an embodiment of the invention. The PSR 203 is deployed at a point of targeted service insertion, which is usually at one or more of the distribution hubs 105 in an HFC configuration. Targeted services are those services intended for a subset of the entire HFC network subscriber base, such as VOD services or the like. Targeted services are contrasted with broadcast services where a given signal that originates from a downstream source, such as the headend 103, to potentially serve all subscriber locations 109 within the general serving area of the communication system 100. Analog and digital audio and video services are examples of broadcast services. It is noted that many details specific to cable transport, such as MPEG over ATM over SONET transport (e.g. digital television or VOD services), implementation of which is apparent to one of skill in the art, are not shown in the interest of focusing on the elements within the cable network that are central to packetized data transport.

The PSR 203 includes one or more network interface modules (NIMs) 301, each configured to interface and terminate links of a particular network communication architecture (104, 214). Both the links (104, 214) and the NIMs 301 may be bi-directional, forwarding information to and from upstream sources. As shown, NIM 301a is coupled to the communication link 104 to enable communications with upstream sources, such as any of the sources 101 and/or the headend 103, etc., either directly or via the switch 201.

The NIM 301a, for example, may include a physical interface, such as a 1000Base-X ethernet transceiver, which converts fiber optic Ethernet signals into electrical signals on a standard gigabit media independent interface (GMII). In an ethernet embodiment, the NIM 301a terminates the GMII with an IEEE 802.3 gigabit ethernet media access control (MAC) entity, which assembles Ethernet frames from the electrical signals of the GMII. Another NIM 301b is provided to interface one or more of the local content servers 209–215 via the corresponding communication protocol, such as 100 or 1000Base-T Ethernet connections or links 214 previously described. The PSR 203 may be implemented in a scalable manner to allow additional NIMs 301, each configured to interface additional communications links (e.g., 104 and 214). In general, the NIMs 301 provide network interfaces to a high-speed local, metro or wide area networks (LANs, MANs, WANs, etc.)

Each NIM 301 includes a physical interface for network connectivity and may include integrated IP forwarding engines that forward traffic between a network interface port and a supervisory switching module 303. The NIM functionality also includes physical encoding and link-layer framing. The supervisory switching module 303 is coupled to one or more channel interface modules (CIMs) 305, where each CIM 305 interfaces a corresponding combiner/TX 205. The supervisory switching module 303 forwards downstream information from the NIMs 301 to a selected one of the CIMs 305, and forwards upstream information from the CIMs 305 to one or more of the NIMs 301. For IP-based embodiments, each of the CIMs 305 adapts IP packets for synchronous downstream transmission and extracts IP packets from synchronous bit streams in the upstream direction. Each of the CIMs 305 forwards downstream data to at least one combiner/TX 205 and receives upstream data from at least one splitter/RX 205. For transmission in the downstream direction, each CIM 305 performs packet encapsulation, forwarding, broadband packet encapsulation, channelization, encoding, modulation and additional RF functions. For transmission in the upstream direction, each CIM 305 performs similar and inverse functions. One difference in the upstream is that the signals are not continuous, which requires that burst mode demodulators be employed to extract the upstream data.

Each CIM 305 supports multiple downstream frequency channels combined and up-converted to a common carrier signal provided to a corresponding combiner/TX 205 via a single connector. In one embodiment, for example, the CIM 305 provides 8 QAM-256 modulated 6 MHz channels, where the corresponding combiner/TX 205 combines the outputs of one or more CIMs 305. In an exemplary embodiment of the communication system 100 that supports television broadcast content in the 54–550 MHz range, the output of each CIM 305 resides within the 550–750 MHz or 550–860 MHz range. The combined physical channels may or may not be contiguous depending on the RF combining and up-converting network implementation. In a particular example, if the QAM signals have carrier frequencies of 600, 606, 612, 618, 624, 630, 636, and 642 MHz, then the output of the CIM 305 occupies the 597–645 MHz spectrum. An adjacent CIM 305 may have carrier frequencies of 648, 656, 662, 670, 678, 686, 694, and 702 MHz occupying the 645–705 MHz spectrum. As a result, the corresponding combiner/TX 205 combines the 51–537 MHz broadcast spectrum with the 597–645 MHz or 645–705 MHz output of one CIM 305 or the 597–705 MHz outputs of the two adjacent CIMs 305. The resulting RF signal is converted to an optical signal and transmitted to a corresponding node 107 by an optical transmitter. It is noted that since each PSR 203 provides a targeted service with spectrum that is only unique to a set of nodes 107 served by an optical transmitter corresponding to a PSR output, the same frequencies may be used for transmission across multiple outputs of each hub 105. Note that a CIM port may serve more than one physical node by replicating the converted optical signal at an intermediate transport node.

The supervisory switching module 303 and its interface to the NIMs 301 and CIMs 305 may be implemented in accordance with any one of many different configurations, where the inventive concept is not limited to any specific configuration. In one exemplary embodiment, the supervisory switching module 303 is implemented in accordance with the common switch interface (CSIX) specification, such as CSIX-L0, CSIX-L1, CSIX-L2, etc., which defines the interface to the switch fabric. Data transferred between NIM 301 and CIM 305 via the switch fabric or the like using CFrames is defined by the applicable CSIX specification.

The supervisory switching module 303 executes IP routing algorithms and performs system management and control functions, either internally or via a separate IP routing block 307 and a separate management block 309. The supervisory switching module 303 distributes routing tables to IP forwarding engines located on each NIM 301 and CIM 305 via the illustrated connections or through a separate control bus or serial link or the like. The supervisory switching module 303 also incorporates switch fabric that provides connectivity for traffic between the NIMs 301 and the CIMs 305. The supervisory switching module 303 may include 10/100 Base-T Ethernet and asynchronous interfaces for management connectivity. In one embodiment, the supervisory switching module 303 includes a high-speed, synchronous, bi-directional, serial crossbar switch that performs the centralized switching function in the PSR 203. The supervisory switching module 303 includes a fabric controller that is responsible for scheduling and arbitration in the switch fabric architecture. The fabric controller manages the connections through the switching fabric using an appropriate scheduling algorithm that is designed to maximize the number of connections per switching cycle. Management functions may be handled within the supervisory switching module 303 or by another management module 307 as illustrated. Each of the NIMs 301 and CIMs 305 may be coupled to the management module 307 via separate management connections (not shown).

Figure 4:
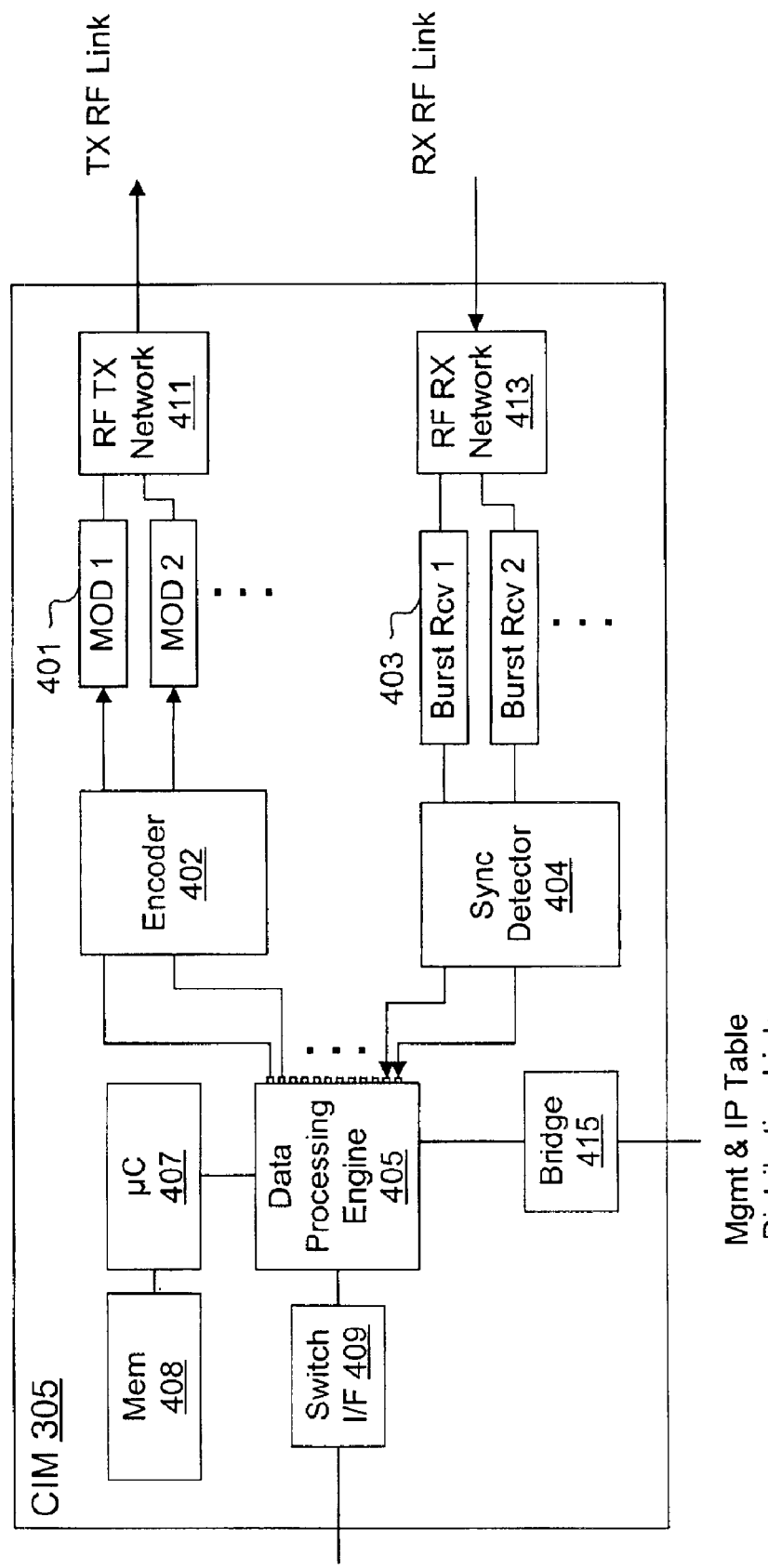
FIG. 4 is a block diagram of a channel interface module according to an embodiment of the invention.

FIG. 4 is a functional block diagram of an exemplary embodiment of a CIM 305. The CIM 305 forwards packets, such as IP packets or the like, and performs packet framing and channelization. In addition, the CIM 305 performs the associated digital and RF signal processing for transmission over the network architecture. Each CIM 305 includes a data processing engine 405 that interfaces the supervisory switching module 303 via a switch interface 409. The data processing engine 405 may include supporting internal or external memory for table-lookups, queued data payload buffer descriptors and data payload buffer storage. Such memory may include any combination of read only memory (ROM) or random access memory (RAM) devices. The data processing engine 405 processes each packet transferred between the network interface via the splitter/RX 207 and the switch interface 409. The data processing engine 405 functionality includes forwarding, link layer framing and physical layer encoding for transmission to the combiner/TX 205 or to switch interface 409 for transmission to the supervisory switching module 303. In addition, the data processing engine 405 performs physical and link layer framing.

The CIM 305 includes multiple modulators (MOD) 401 coupled to the data processing engine 405 via an encoder 402 to enable broadband modulated transmission of packetized data. The CIM 305 further includes multiple burst mode receivers 403 coupled to the data processing engine 405 via a synchronization detector 404. In one embodiment, the encoder 402 performs continuous-mode randomization, error encoding and interleaving on separate streams of data and the modulators 401 perform QAM-256 for data transmission of each stream. The outputs from the modulators 401 are combined in the frequency domain by an RF transmitter network 411, which provides a single combined, up-converted, amplified, and filtered output via a corresponding transmitter RF link. Such analog RF processing includes filtering, frequency combining and mixing. Likewise, the burst receivers 403 receive upstream information through a corresponding splitter/RX 207 via an RF receiver network 413. The RF receiver network 413 processes analog RF signals, where such processing includes frequency tuning, filtering and mixing. The burst receivers 403 perform similar and inverse functions of the modulators 401 and provide separate streams of non-modulated data to the synchronization detector 404. The synchronization detector 404 provides the separate upstream data streams to the data processing engine 405. The number of modulators 401 and burst receivers 403 may be the same for symmetrical embodiments. Nevertheless, any number of transmitters and receivers can be implemented depending upon the particular architecture and configuration.

In the downstream direction, the data processing engine 405 forwards a packet from the switch interface 409 to the appropriate channel based on destination address. The data processing engine 405 performs data link layer encapsulation using a packet adaptation procedure (PAP) to encapsulate packets into frames. The data processing engine 405 adapts the frames for cell transport suited for encoding using a cell convergence procedure (CCP). In one exemplary embodiment, such encoding is according to the Reed-Solomon (RS) encoding procedure. In a more specific embodiment, for example, (204, 188) RS encoding for 188-byte cell transport is employed although other types of encoding or other variations can be implemented, such as, for example, (255, 239) RS encoding. The data processing engine 405 also performs time division multiplexing (TDM) of dedicated time slots within each physical downstream channel. Cell length is defined by the number of bytes transmitted during each TDM timeslot. A one-to-one mapping exists between a cell, i.e., fixed length packet, and a Reed Solomon code word. One code word is transmitted during each timeslot. The data processing engine 405 adapts packets for synchronous transmission and extracts packets from synchronous bit streams. Each subscriber channel is a bi-directional data link layer communications channel between the PSR 203 and the gateway 801 of each subscriber location 109 served by the PSR 203.

For downstream packet processing, the CIM 305 performs a series of protocol functions upon the ingress frames, adapting packets into synchronous bit-streams for transmission over a corresponding channel. The general process illustrated is agnostic relative to the type of packets or frames, such as Ethernet frames, ATM cells, CSIX frames, etc. The data processing engine 405 performs packet decapsulation and/or re-assembly for each downstream frame, where particular processing depends upon the particular packet data format. The resulting packets are forwarded to an appropriate channel corresponding to the destination address indicated in an associated header. In one embodiment, the data processing engine 405 includes separate channel processing modules or blocks are for each channel. Alternatively, the data processing engine 405 separates the channels within its memory.

The digital data output from each of the modulators 401 are provided to the RF transmitter network 411 for RF processing and transmission. In particular, the RF transmitter network 411 maps the data into code words, converts the code words into a waveform, and modulates the waveform to an intermediate frequency (IF), such as between 30 MHz and 60 MHz. The IF signal is then up-converted to any one of several 6 MHz channels within the applicable frequency range (550–860 MHz for the consumer broadcast television embodiment) by an up-converter (not shown). In one embodiment, two stages of up-conversion are used to achieve desired signal-to-noise levels. The up-converted signal is amplified and equalized for transmission over the TX RF link. The RF transmitter network 411 performs RF aggregation and provides the ability to operate anywhere within the applicable downstream frequency range based on software configuration. The RF transmitter network 411 outputs an RF signal that incorporates the combined information from each of the modulators 401.

The RF receiver network 413 includes an analog front end (AFE) and analog-to digital Converters (ADCs) for providing digital signals for use by each of several burst mode receivers 403. The RF receiver network 413 includes an RF tuner, amplifiers, filters, mixers and at least one frequency converter (not shown) that tunes to a corresponding upstream frequency channel for detecting and resolving the incoming signal. The RF receiver network 413 selects RF channels in the applicable frequency range (5–42 MHz for the consumer broadcast television embodiment) used for upstream transmission. The RF receiver network 413 may be configured with the ability to operate anywhere within the applicable downstream frequency range or any other desired frequency range. Each burst receiver 403 may be implemented in a standardized or off-the-shelf manner and is equipped to receive and demodulate bursts of data as opposed to continuous streams of data. For example, the burst receivers 403 make timing and carrier estimates based on a preamble 1039 (FIG. 10B) of an incoming burst, and jump to a locked state to allow demodulation. Each burst receiver 403 demodulates a single frequency channel that includes multiple time slots. Each time slot meets or exceeds a minimum throughput requirement, such as 500 kilobits per second (kbps) in a specific embodiment. Each burst receiver 403 is assigned at least one time slot on any given carrier, and may consume multiple time slots to increase throughput.

Demodulation is implemented according to any one of several different modulation schemes, such as QAM-16, QAM-64, QAM-256, or the like. The demodulated data is forwarded to the synchronization detector 404. The synchronization detector 404 includes buffers, such as first-in, first-out (FIFO) memory devices or the like, and appropriate interface circuitry for interfacing the data processing engine 405. The data processing engine 405 performs time division de-multiplexing of dedicated time windows corresponding to upstream channel slots within each physical channel. The data processing engine 405 further performs an inverse CCP and data link layer decapsulation of resultant frames using an inverse PAP. The resulting packets are forwarded to the supervisory switching module 303 via the switch interface 409.

The communication between each subscriber location 109 and a corresponding distribution hub 105 experience propagation delays via the communication links 106 and 108.

Typically, the length of fiber optic links between each distribution hub 105 and corresponding nodes 107 are less than 70-miles (140-miles roundtrip). Given that the worst-case propagation delay incurred in a 1-mile fiber optic run is approximately 10 microseconds ($\mu$s), a 70-mile fiber link results in a round trip time of 1.4 milliseconds (ms). Likewise, the length of the subscriber links 108 between each node 107 and the corresponding subscriber locations 109 are less than 10-miles (20-miles roundtrip). Given that the worst-case propagation delay incurred in a 1-mile foam-filled coax run is approximately 16.3 $\mu$s, a 10-mile foam-filled coax run results in a round trip time of 163 $\mu$s. As a result, the combined maximum propagation time for the theoretical HFC network is equal to or less than 1.563 ms. For a symbol period of approximately 390 nanoseconds (ns) at a data throughput rate of 2.56 megabaud (Mbaud) for upstream communications, described further below, this delay represents approximately 4000 symbol periods. These parameters and distances represent worst-case estimates on the propagation times of signal over cable, and do not take into account in-line equipment on the HFC network, signal attenuation, or frequency dependant effects of the channel.

The communication system 100 illustrated in FIG. 1 is a simplified representation of a physical realization of a communication system. Generally, the electrical and physical separation between a given node 107 and each of its subscriber locations 109 varies. It is further appreciated that the physical and electrical distance between each distribution hub 105 and its corresponding nodes 107 may also vary by a significant amount. It is understood, therefore, that the propagation delay between a subscriber location 109 and its respective CIM 305 is significantly different for each subscriber location 109 assigned to the same channel. For example, each codeword transmitted from a CIM 305 of a given distribution hub 105 at a given point in time to corresponding subscriber locations 109 in a given frequency channel arrives at those subscriber locations 109 at substantially different times. Such propagation delay variances among subscriber locations 109 is not a significant problem for downstream communications since the gateway 801 at each subscriber location 109 to the symbols in the continuous downstream symbol stream, which arrive at a particular subscriber location 109 regularly regardless of the delay between subscriber locations 109. Such propagation delay variances need to be resolved, however, before upstream burst communications can be synchronized with each other. The burst communications from each gateway 801 at each subscriber location 109 in a given upstream frequency channel experience disparate propagation delays to the CIM 305. Such propagation delay variances would otherwise cause interference between and prevent synchronization between gateways 801 communicating within the same upstream frequency channel.

The CIM 305 includes a general purpose processor or microcontroller ($\mu$C) 407 or the like, coupled to the packet processing engine 405, for handling administrative tasks and further for initializing each gateway 801 for both downstream and upstream communications. An optional memory 408 may be provided and coupled to the $\mu$C 407 for storing data, variables and parameters or the like for facilitating its various functions. In the embodiment shown, the $\mu$C 407 performs a ranging process in an attempt to minimize the variance in burst arrival time at the receiver of the CIM 305 for each gateway 801 in a given upstream frequency channel despite propagation delay differences. The ranging process is conducted during initialization of each gateway 801. Such initialization or "bringing up" process introduces the gateway 801 at a new subscriber location 109 into a new or established communication channel (both up and down) without significantly disrupting the integrity of services (if any) currently active on that channel.

In an embodiment of the invention, the initialization process of a new gateway 801 comprises three phases including staging, discovery, and joining. Particularly, the staging phase is responsible for identifying the new gateway 801 and recording the identity in the system, which may occur before the gateway 801 is physically connected to the system. Staging is primarily an administrative task that comprises entering configuration information for the new gateway 801 into a data repository or database accessible by the CIM 305. In particular, a given CIM 305 of a given PSR 203 of a given distribution hub 105 is selected to service a new gateway 801. The configuration information may be stored, for example, in the memory 408 of the selected CIM 305. The discovery phase refers to the time period after staging, but before the new gateway 801 establishes two-way communications with the CIM 305. The joining phase includes ranging (slot offset generation) and equalizer training to enable upstream communications in an assigned upstream channel without interfering with other gateways 801 in the same channel, if any. After the joining phase is completed, the gateway 801 is able to undertake two-way communications.

The discovery phase includes the power-up sequences of the gateway 801 along with the processes for seeking and identifying the downstream channel assigned to the gateway 801. As described previously, the downstream spectrum may be divided into separate frequency channels (e.g., 6 MHz channels) and each channel may be further divided into time slots employing TDM techniques (e.g., 8 time slots per channel). The new gateway 801 is assigned to one or more time slots within its assigned channel. The $\mu$C 407, being programmed with configuration information of the new gateway 801, instructs the data processing engine 405 to transmit a configure or "HELLO" message comprising, for example, an assigned upstream channel, within at least one assigned time slot of the assigned downstream channel to the new gateway 801. In this manner, the configure or HELLO message is transmitted periodically or continuously in the downstream channel until detected by the new gateway 801. The new gateway 801 may not be installed or connected for a substantial period of time, such as several days or the like. There is no interference with any other gateways on the same downstream channel since the new gateway is assigned its own one or more time slots. In an embodiment of the invention, the new gateway 801 may be preprogrammed with its assigned downstream channel and time slot(s) assignment. In this embodiment, the gateway 801 powers up, initializes, synchronizes with its assigned downstream channel and begins detecting the HELLO messages from the corresponding CIM 305. In an alternative embodiment, the gateway 801 is configured to conduct a discovery process in which it scans each downstream channel, one at a time, and one or more time slots within each channel, until it detects the HELLO message. In either case, the new gateway 801 comes online and eventually synchronizes with the corresponding CIM 305 in the assigned downstream channel and time slot(s).

After the discovery phase of the new gateway 801 is complete, the gateway 801 and the CIM 305 conduct the joining process. The joining phase is the final step in establishing a two-way communication path between the CIM 305 and the gateway 801 with minimal disruption to the operation of other gateways 801 on the upstream channel, or impairing their ability to handle data services that are delay sensitive. The joining phase is a sequence to derive the unique upstream timing characteristics of the new gateway 801.

The joining phase begins by the CIM 305 sending a "Range" message to the new gateway 801. The "Range" message to the new gateway 801 instructs the gateway 801 to prepare to measure the round trip delay of send and receive times. After the "Range" message is sent, the CIM 305 sends to all gateways 801 on the upstream channel a "Stop Transmit" message to instruct the gateways 801 not involved in the joining phase to disable their transmitters. Such disabling or silencing of the upstream transmitters does not need to be very long, and may only be for one or two round robin periods or transmission windows. Such disabling is also performed relatively infrequently, such as every one or two minutes or so, and only when a new gateway 801 is anticipated, so that upstream communications from the existing gateways 801 are not significantly effected. When the CIM 305 detects silence on the upstream channel, the CIM 305 sends a "Calibrate Transmit" message to the new gateway 801. The new gateway 801, upon receiving the "Calibrate Transmit" message, initiates an upstream burst on the channel. When the upstream burst is detected, or a timeout occurs waiting for the upstream burst, the CIM 305 to send a "Resume" message to all gateways 801 on the upstream channel to enable their transmitters and resume upstream transmissions. The new gateway 801 involved in the joining phase ignores the "Resume" message until the joining phase is successful. This process continues until the new gateway 801 is joined to the channel, or until a timeout occurs.

In an embodiment of the invention, the CIM 305 also transmits a "Configure Gateway" message containing a gateway identifier, or "GatewayID", to the new gateway 801 in the downstream channel coincident with the silenced upstream channel to enable the new gateway 801 to respond, if and when present. The Configure Gateway message may be continuously transmitted until the gateway 801 is joined to the channel through the channel joining process, or until a timeout occurs. In an alternative embodiment of the invention, the "GatewayID" can be transmitted to the new gateway 801 in the "HELLO" or configure message during the discovery phase. This allows the new gateway 801 to uniquely discover at least one of the downstream timeslots configured for the new gateway 801 during the staging phase.

The "Calibrate Transmit" message signals the sync detector 404 to prepare to align an upstream burst from the new gateway 801 to a "burst window" within a single timeslot or multiple timeslots in the upstream transmission window. Since the "Calibrate Transmit" message may be sent in a downstream timeslot at any time in the upstream transmission window, the timing between the CIM 305 and gateway 801 is driven based upon a unique and common timing reference, the "sync mark" 513. Once the "Calibrate Transmit" message is received in the encoder 402, the sync detector 404 is expected to receive an upstream burst transmission in a "burst window" of a timeslot after receiving a "sync mark" in the encoder 402. The expected reception of the upstream burst may be after any predetermined "sync mark" following the "Calibrate Transmit" message. Respectfully, the gateway performs a similar process to initiate the upstream burst. Upon detection of the upstream burst, the sync detector 404 determines if the reception of the upstream burst is within the expected "burst window" of the timeslot. If not, the time variance between the expected reception of the burst and the actual reception of the burst is calculated, and used to calculate new timing parameters for the new gateway 801. This information is re-distributed to the new gateway 801 from the CIM 305 in the "HELLO" or configure message. The joining phase is repeated until the "Calibrate Transmit" triggers an upstream burst from the new gateway 801 that coincides with the expected reception of a burst in the expected "burst window" of the timeslot or timeslots selected in the joining phase.

In operation, the new gateway 801 detects the command to silence the other upstream transmitters (e.g., a multicast type message or the like), and/or otherwise detects the Configure Gateway message in the downstream, and immediately responds with a burst communication or the like. The CIM 305 determines a send time value denoting when each Configure Gateway message is sent and a receive time value upon receiving a response from the target gateway 801. For example, the $\mu C$ 407 includes a timer or counter or the like that measures the round trip time between the send and receive times. In this manner, the difference in the send and receive time values indicates the round trip propagation delay between the CIM 305 and the new gateway 801. The CIM 305 (e.g. the $\mu C$ 407) measures the propagation delay for each gateway 801 in each channel in a similar manner during the joining process. The CIM 305 then determines one or more timing parameters or the like, described further below, for configuring upstream communications of the new gateway 801 based on the measured propagation delay. The CIM 305 then configures the new gateway 801 by sending the configuration parameters or values to the new gateway 801 during normal downstream communications. In one embodiment, the other gateways in the same upstream channel are not further disturbed and resume normal operation immediately after the silenced upstream time period. Also, the Configure Gateway sequence is terminated unless or until another new gateway 801, if any, is provisioned for the same upstream channel. Alternatively, the CIM 305 may conduct further configuration operations, and when the CIM 305 is finished configuring, or attempting to configure the new gateway 801, any other gateways on the channel are returned to normal operation. Once successful, the CIM 305 sends a message to the new gateway 801 indicating a successful joining phase has taken place and the new gateway 801 is able to begin normal operation on the upstream channel. In alternative embodiments of the invention, conventional methods for measuring or otherwise joining equipment to a network and determining propagation timing are employed, implementation and identification of which is apparent to one of skill in the art.

Figure 5:
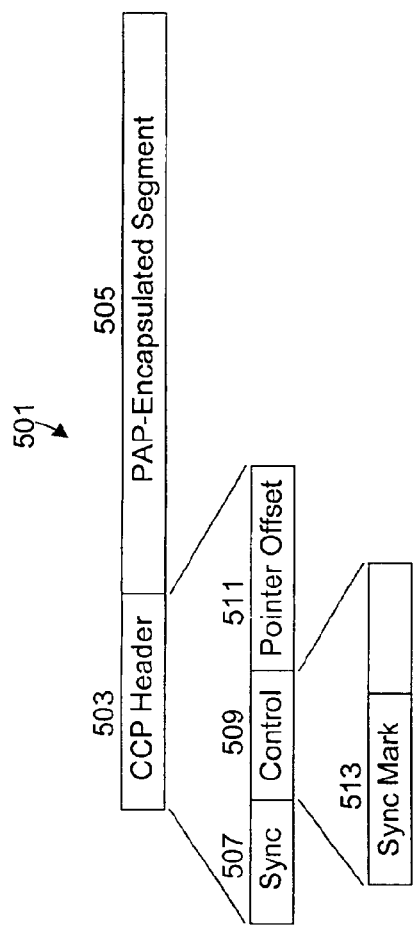
FIG. 5 is a block diagram of an exemplary CCP cell generated by the cell processing engine of FIG. 4.

FIG. 5 is a block diagram of an exemplary CCP cell 501 generated by the data processing engine 405. The PAP encapsulates each packet prior to transmission by prepending a PAP header (not shown) to the packet to formulate PAP frames. The CCP adapts the resulting PAP frames for RS payload insertion by dividing PAP frames into segments and adding a CCP header 503 to each segment (forming a PAP encapsulated packet or segment 505). The CCP header 503 includes "sync" field 507 for storing a synchronization value, a control field 509 and a pointer offset field 511. The pointer offset field 511 identifies the beginning of the next PAP header in the current or a subsequent CCP cell. The control field 507 further includes a synchronization identifier or mark referred to as a "sync mark" 513. As described further below, the data processing engine 405 uses the sync mark 513 in the downstream transmission as a window synchronization signal to synchronize upstream communications. In an embodiment employing (204, 188) RS encoding, each CCP cell 501 is 188 bytes in length including a 3-byte CCP header 503 and a 185-byte segment 505. The control field 507 can be any desired length, and includes at least one bit forming the sync mark 513.

Figure 6:
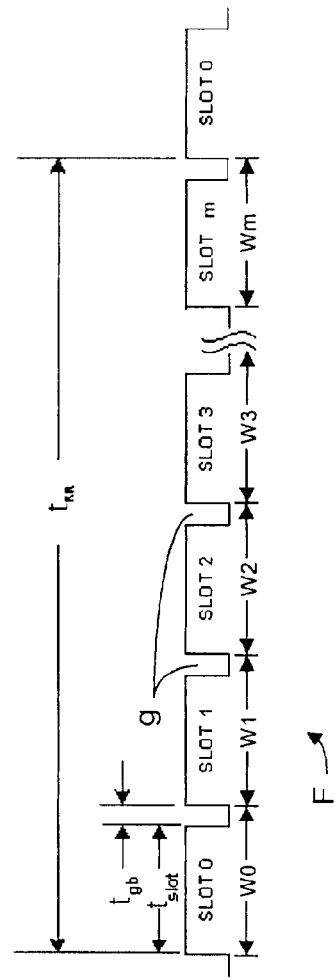
FIG. 6 is a timing diagram illustrating a time division multiple access (TDMA) over frequency division multiple access (FDMA) scheme according to an embodiment of the invention.

FIG. 6 is a timing diagram illustrating a TDMA over FDMA scheme that is used by the communication system 100 for upstream communications. In contrast to the RF transmitter, which transmits from a central location (e.g., a CIM 305) to distributed subscriber locations 109, the RF receiver at each CIM 305 supports a master-slave, many-to-one TDMA over FDMA transmission system. The gateway 801 at each subscriber location 109 operates on a single frequency channel, and transmits data during time slots allocated by the RF receiver of the CIM 305. In this manner, many transmitters, each located at a corresponding subscriber location 109, operate in burst mode to transmit bursts of data that are frequency and time mapped for reception by a given receiver of a corresponding CIM 305 of a corresponding PSR 203. Each CIM 305 receiver operates as the master of a single frequency channel, where it coordinates TDMA transmitters and handles link configuration and maintenance. Each subscriber gateway burst transmitter operates as a slave, waiting for a windowing signal to arrive from the master receiver before transmitting on the upstream channel. In the exemplary embodiment shown and illustrated herein, the sync mark 513 is used to define the windowing signal to synchronize the upstream communications.

The upstream bandwidth is divided into multiple channels, where each upstream frequency channel is further divided into a predetermined number of time windows. As shown, a repeating pattern of "n" time periods, individually illustrated as W0–Wm, where n="m"+1, each form a frame, denoted "F". A time period or "burst time" is defined as the amount of time allocated to each burst transmitter (at the subscriber locations 109) to send a predetermined or fixed amount of information. Each time period Wn includes a time slot, individually shown as SLOT 0–SLOT m, and an interframe gap, denoted "g", for transmission of data. The guard band duration of each interframe gap g is denoted "$t_{gb}$," and the duration of each time slot is "$t_{slot}$". Thus, each consecutive time slot is separated from the previous time slot by a single interframe gap g. It is noted that subsequent references to time slots herein generally include the corresponding interframe gap unless otherwise stated. Each transmitter at a subscriber location 109 is configured to transmit a fixed amount of information during each of one or more time periods within its assigned frequency channel. The data is configured into fixed-sized frames or codewords and includes an initial synchronization preamble 1039 added to the codeword. Each time period W represents a particular portion of the overall bandwidth of the frequency channel. Thus, the number of time periods assigned to each subscriber location 109 within a frequency channel determines that subscriber location's bandwidth. Time periods are served in round robin fashion during each frame in a "transmission window" or round robin time, denoted "$t_{RR}$".

Figure 7:
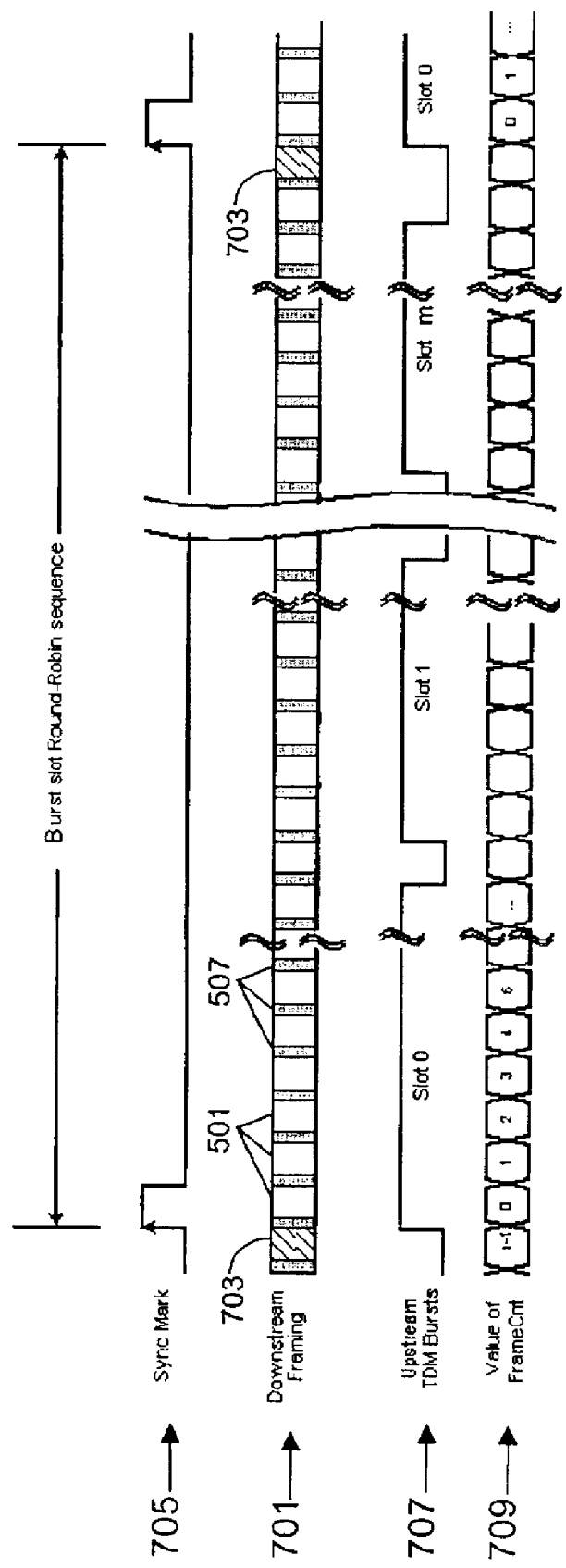
FIG. 7 is a timing diagram illustrating the use of downstream synchronization marks as an upstream timing reference and illustrating the corresponding timing relationship between upstream and downstream data streams according to an embodiment of the invention.

FIG. 7 is a timing diagram illustrating the use of the downstream sync mark 513 as a windowing identifier mechanism to provide an upstream timing reference and illustrating the corresponding timing relationship between upstream and downstream data streams. Since upstream transmission operates in burst mode as opposed to continuous mode, each burst transmission resynchronizes with a corresponding burst receiver 403 for each transmission window or round robin time period. In order to assure relative synchronization between all of the TDMA transmitters on a given channel so that transmissions do not overlap, each burst transmitter 813 (FIG. 8) is synchronized using the downstream transport stream. In the particular embodiment shown, upstream timing synchronization is derived from the downstream "spoofed" MPEG framing. MPEG "spoofing" implies that the CCP of the downstream transmitter inserts a synchronization byte in the first field of the CCP frame in a like manner to MPEG frame synchronization byte insertion since MPEG frames are of the same length. MPEG "spoofing" is implemented in downstream communications in order to utilize the International Telecommunications Union (ITU) J.83 Annex A recommendation method of transmission over an HFC plant since the method of transmission specifies MPEG as the transmission format but only actually requires the MPEG synchronization field for proper operation. It is noted that the invention is not limited to this MPEG spoofing technique and that other synchronization methods may be employed, implementation and identification of which is apparent to one of skill in the art.

The start of each upstream round robin is based on the end of the last downstream codeword or CCP cell that has a sync mark 513, where having a sync mark 513 means that the sync mark bit is logically TRUE. It is noted that references to logic operation as used herein incorporate either positive or negative logic conventions or any combination thereof (e.g., a bit set to logic "one" may indicate TRUE for positive logic or FALSE for negative logic depending upon the logic convention employed). Waveform 701 illustrates downstream data cells 501 received at a subscriber location separated by corresponding sync fields 507. First and second CCP cells 703 of the stream have sync marks 513 to thereby define a transmission window or burst round robin sequence as indicated by waveform 705. Waveform 707 illustrates the resulting upstream TDMA bursts allowed within corresponding time SLOTs 0–m, for n time slots. The beginning of each sequence of round robin burst times is based on the end of the last downstream codeword that contains a sync mark 513 (meaning the sync mark bit or value is logically TRUE). The round robin burst sequence is completed at or prior to the next subsequent downstream codeword that contains a sync mark 513. Waveform 709 illustrates the value of a frame count (FrameCnt) variable used for timing the upstream TDMA bursts based on downstream timing.

Each subscriber location 109 is allocated one or more of n time slots per round robin cycle (0 time slots to disable the location), where each time slot represents 1/n of the total channel bandwidth when n slots are in use on a carrier. Multiple time slots are allocated to a subscriber location 109 to increase bandwidth by a multiple amount. The assignment of particular time slots is arbitrary so that the time slots assigned to a given subscriber location 109 need not be contiguous or sequential. For example, if a subscriber location 109 is allocated four time slots for 4/n of the total bandwidth, that subscriber location 109 may be assigned to any four of the time slots without regard to ordering. Each subscriber location 109 may only transmit a burst within its assigned time slot(s) to prevent interference with other subscriber locations 109 in the same frequency channel.

In a particular exemplary embodiment, each frequency channel is 3.2 MHz wide with a roll-off factor of 0.25 to achieve an effective channel bandwidth of approximately 2.56 MHz and a baud rate of 2.56 Mbaud. Each frequency channel is further divided into 16 time windows and 16 corresponding time slots. QAM-16 modulation is used to achieve four (4) bits per symbol resulting in a raw data rate of approximately 10.24 Mbps for each channel and a raw data rate of approximately 640 kilobits per second (kbps) for each time slot. For an upstream efficiency rate of approximately 86%, the actual throughput for each frequency channel is approximately 8.8 Mbps and approximately 550 kbps for each time slot. In this manner, each subscriber location 109 may be allocated multiples of 550 kbps upstream bandwidth up to almost 9 Mbps for a given channel. In a typical U.S. configuration using the 5–42 MHz frequency range for a total of 11 channels, the total upstream capacity is almost 97 Mbps. It is noted that this particular embodiment represents a specific implementation and that the invention is not limited to these parameters.

As described above, a propagation time is resolved during initialization for each gateway 801 at each subscriber location 109 for each channel. Slot and propagation timing is measured in symbol unit times, in which a symbol time is the duration of a symbol. For a particular exemplary system using 3.2 MHz frequency channels and QAM-16 modulation with a 2.56 Mbaud symbol rate, the symbol time is approximately 390 ns. The CIM 305 transmits several variables to each gateway 801 during the initialization and joining procedures described above. The variables include a transmit offset "TXOff" value that represents the number of upstream symbol periods from receipt of the sync mark to beginning of SLOT 0. The TXOff value compensates for the propagation delay associated with the location of the gateway 801 relative to the CIM 305. The variables include a time slot assignment value "SlotMask" that is an n-bit mask that denotes which time slots that the gateway 801 may use for transmission of data. For 16 defined slots, for example, the SlotMask value is a 16-bit field having corresponding slot bits set to identify assigned slots. The time slot assignment value is a programmed subset of time slots for each transmission window of a given upstream frequency channel. The time slots for each channel are assigned on a mutually-exclusive basis to prevent interference between gateways 801 within the same channel. The variables include a time slot duration value "SlotDur" that identifies the number of symbols in a burst including the guard band and the preamble. Once the start time of the first time slot is determined, the start time of each subsequent time slot is determined by adding the time slot duration value to a start time of a previous time slot start time beginning with the first time slot. Finally, the variables include a round robin duration value "RRDur" that defines the length of a round robin in upstream symbol times.

The CIM 305 monitors upstream communications and may adjust the variables to improve communications, if desired. Such adjustment is achieved by reprogramming each of the gateways 801 of a given upstream channel. All of the TXOff values may be adjusted by a constant amount to effectively position each of the time windows in time within each round robin window (e.g., slide the time windows earlier or later in time). The TXOff values of each gateway 801 in a given upstream channel may also be adjusted relative to each other to adjust timing of the interframe gaps. The interframe gaps, for example, may be modified based on the quality of the medium. The interframe gaps may be increased, for example, if the medium quality is less than optimal to correspondingly increase communication robustness. The interframe gaps may also be decreased to increase communication efficiency. It may also be deemed desirable to adjust timing to begin the first slot as soon as possible, such that only the electrically closest gateway may transmit during the first slot. The TXOff value for the electrically furthest gateway, in this case, may be a negative value since by the time the sync mark is received, the first slot is already in progress or even completed. In one embodiment, negative offset values are possible and used for one or more gateways in a given upstream channel. In an alternative embodiment in which it is desired to only use positive offset values to simply computations and digital circuitry, an entire round robin time period is added to an otherwise negative offset so that the corresponding gateway effectively communicates in the next round robin sequence. Although each gateway so adjusted is effectively behind by one cycle, this is a relatively inconsequential time delay. In any event, burst communications among the gateways are synchronized in such a manner to prevent or otherwise minimize interference.

Figure 8:
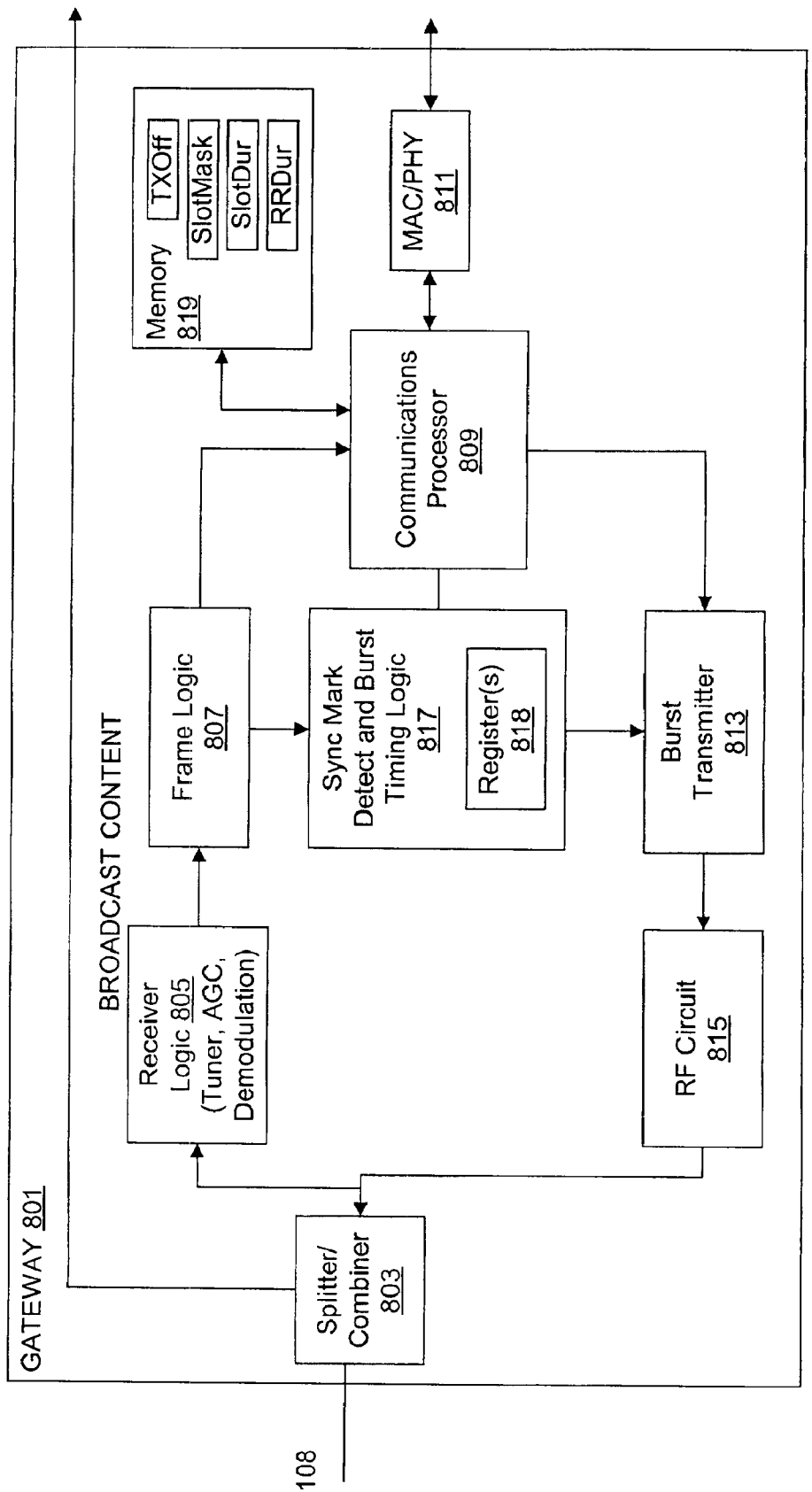
FIG. 8 is a block diagram of a subscriber modem device (gateway) according to an embodiment of the invention.

FIG. 8 is a simplified block diagram of exemplary gateway 801 located at each subscriber location 109 that tunes, de-modulates, and decodes source information from the combined electrical signal addressed or otherwise intended for the particular subscriber location 109. The gateway 801 may be incorporated within, or otherwise coupled to other subscriber devices, such as other gateways, set-top boxes, cable modems, etc. The gateway 801 includes a diplexer 803 coupled to a subscriber medium link 108 for extracting broadcast content, such as analog television broadcast transmissions. The remaining RF spectrum dedicated to subscriber channels is provided to receiver 805. The receiver 805 may include an RF tuner (not shown) that is programmable and eventually tuned to a corresponding physical channel transmitted by a corresponding CIM 305. The receiver 805 may further include automatic gain control (AGC) circuitry or the like (not shown) to control the gain of the incoming signal to within a target power level. The filtered channel signal is provided to a demodulator (not shown), which generally performs the demodulation procedure corresponding to the upstream modulator's 401 modulation procedure, such as according to QAM-256 modulation or the like. The demodulated digital signal is then provided to frame logic 807, coupled to the receiver 805, that detects the sync bytes in the data stream and extracts one or more digital codewords within each group of data that corresponds to its assigned transport channels. The frame logic 807 includes a decoder (not shown), which performs the de-interleaving decoding processes corresponding to the encoder 402. The frame logic 807 also includes a derandomizer (not shown) that reverses the randomization process, a serializer (not shown) and frame recognition logic (not shown) that converts the digital codewords into the CCP cells transmitted by the CIM 305. The CCP cells are then provided to a communications processor 809, that performs the inverse CCP and PAP functions and re-assembles the original packets transmitted via the corresponding PSR 203. The communications processor 809 forwards the digital packetized information to an appropriate subscriber device as indicated by a destination address via an interface device 811, e.g., MAC/PHY device.

Packets received from one or more subscriber devices are provided to the communications processor 809 via the interface device 811. The communications processor 809 performs PAP and generates PAP encapsulated frames and performs CCP to convert the PAP encapsulated frames into CCP cells in preparation for encoding. The communications processor 809 may further perform scrambling or randomization in order to remove DC bias in the data stream and to ensure a constant peak-to-average power ratio for the channel. Such randomization may be based on the ITU J.83 Annex A recommendation. The communications processor 809 then provides the CCP cells to a burst transmitter 813. In one embodiment, the burst transmitter 813 performs Reed-Solomon (RS) forward error correction (FEC) encoding on each block of upstream data, such as according to RS (204, 188). The burst transmitter 813 may further append the preamble 1039 (FIG. 10B) at the start of the transmission. In one embodiment, the preamble 1039 is 0 to 32 symbols (0 to 16 bytes for 4-bit symbols) of programmable content. Each of the upstream transmitters on a given carrier frequency channel typically use a common preamble assigned by the control channel. Burst transmitter 813 performs QAM-16 or QPSK modulation, although other modulation techniques can be implemented. The burst transmitter 813 may also perform filtering and forward equalization. The RF output of the burst transmitter 813 drives an upstream RF amplifier within RF circuitry 815. The burst transmitter 813 may also have outputs to enable and control the gain of the RF amplifier. The output signal is asserted onto the subscriber media link 108 via the diplexer 803. The corresponding CIM 305 receiving the transmission may be configured to monitor the spectrum of the upstream signal and send control messages to the gateway 801 to adjust the equalizer coefficients. The CIM 305 may further be configured to monitor the center frequency of the upstream signal and may send control messages to tune the center frequency offset.

As described previously, an initialization process is conducted to configure and establish a new gateway 801. A HELLO message or the like is repeatedly transmitted downstream, which is detected by the new gateway 801 after being connected and powered on. The communications processor 809 or other control logic may be configured to control the receiver 805 and the frame logic 807 to tune to each channel and to conduct the scanning process. Each HELLO message includes identifier information or the like of the new gateway 801 so that the each new gateway is able to detect that whether a HELLO message is intended for it or another new gateway. Upon reception of the Range message in the new gateway 801, the communications processor 809 configures the sync mark detect and burst timing logic 817 to prepare to calibrate the upstream transmission. Once the CIM 305 has silenced the upstream channel, it sends the "Calibrate Transmit" message to the new gateway 801. Upon reception of the "Calibrate Transmit" message in the new gateway 801, the sync mark detect and burst timing logic 817 prepares to send an upstream burst in the predetermined timeslot or timeslots immediately upon detection of the predetermined "sync mark". Once the sync mark detect and burst timing logic 817 detects the "sync mark", the sync mark detect and burst timing logic 817 triggers an upstream burst on the timeslot or timeslots based upon the current timing logic. If the upstream burst is successful, the new gateway 801 can be placed into service. Otherwise, the new timing parameters based upon the upstream burst results are re-distributed to the new gateway 801 in a new "HELLO" or configure message.

As described previously, the CIM 305 detects the response and measures or otherwise determines propagation delay between it and the gateway 801. The CIM 305 then determines timing parameters and sends the timing parameters or slot timing variables to the gateway 801. The gateway 801 further includes a memory 819 coupled to the communications processor 809. The memory 819 may be configured in any desired manner, such as any combination of read-only memory (ROM) and random access memory (RAM) devices or the like, such as, for example, Non-Volatile RAM (NVRAM) devices. The communications processor 809 operates to retrieve the slot timing variables transmitted by the CIM 305, such as including the TXOff, SlotMask, SlotDur and RRDur values, and to store these variables into the memory 819. The gateway 801 further includes sync mark detect and burst timing logic 817, coupled to the frame logic 807 and the burst transmitter 813, that detects codewords with sync marks 513 from the downstream information and that controls the burst transmission timing accordingly. The burst transmissions of the burst transmitter 813 are controlled by the communications processor 809 and the sync mark detect and burst timing logic 817 according to slot timing. In the embodiment shown, the sync mark detect and burst timing logic 817 includes one or more registers 818 that are programmed by the communications processor 809 with values corresponding to the slot timing variables, such as the TXOff, SlotMask, SlotDur and RRDur values. Once these values are stored in the registers 818, the sync mark detect and burst timing logic 817 is effectively programmed for upstream communications. In particular, the sync mark detect and burst timing logic 817 is configured to detect the reception of synchronization marks transmitted by the CIM 305, and further includes timers or counters or the like to determine a receive time or time of reception of the mark. The sync mark denotes the initiation of a new transmission window. The sync mark detect and burst timing logic 817 adds the transmit offset value TXOff to the mark receive time to calculate the beginning time of the first time slot in the current transmission window. The sync mark detect and burst timing logic 817 adds the time slot duration value SlotDur, which includes timing for an interframe guard band, to the beginning time of the first time slot to identify the beginning of the second time slot. The sync mark detect and burst timing logic 817 repeatedly adds the time slot duration value SlotDur to each time slot start time to identify the start time of the next time slot.

Figure 9:
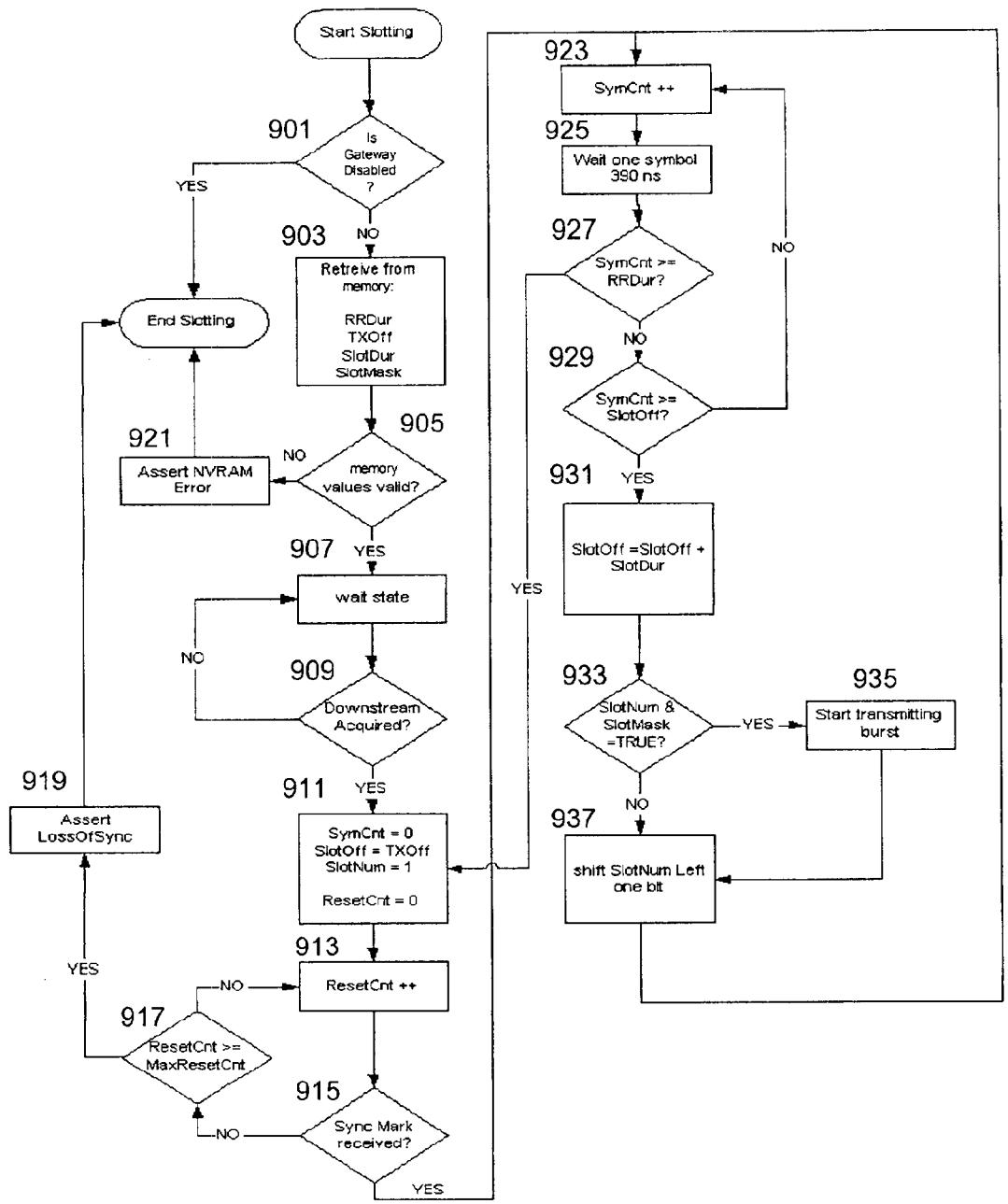
FIG. 9 is a flowchart diagram illustrating operation of the communications processor and the sync mark detect and burst timing logic of the gateway of FIG. 8 to conduct TDMA time slot allocation and to control burst transmission timing.

FIG. 9 is a flowchart diagram illustrating operation of the gateway 801, particularly, the operation of communications processor 809 and the sync mark detect and burst timing logic 817, to conduct TDMA time slot allocation and to control burst transmission timing. At first decision block 901, it is queried whether the gateway 801 is disabled. If so, the slot timing procedure is terminated. Otherwise, operation proceeds to block 903 at which the TXOff, SlotMask, SlotDur and RRDur values programmed into the memory 815 are retrieved. The values are queried for validity at next decision block 905, and if not valid, operation proceeds to block 921 to assert a memory error and the slot timing procedure is terminated. If the retrieved values are valid as determined at block 905, the values may be programmed in the registers 818 to complete the programming of the sync mark detect and burst timing logic 817. Also, operation proceeds to a wait state block 907, which inserts a predetermined incremental wait state amount of time in the process. After the wait state, operation proceeds to next decision block 909 to determine whether downstream communications have been acquired. If not, operation loops between the wait state 907 and block 909 to wait until downstream communications have been acquired.

When the downstream communications have been acquired as determined at block 909, operation proceeds to block 911 at which several variables are initialized. In particular, a symbol counter value "SymCnt" is initialized to zero. The SymCnt value is a counter that is incremented (block 923) every upstream symbol period (block 925) and is used as the timing basis for slot timing. A slot offset value "SlotOff" is initially set equal to the TXOff value. The TXOff value is the offset or number of upstream symbol periods from the receipt of a sync mark to the beginning of the first slot or SLOT 0, and is the value that compensates for the propagation delay associated with the gateway 801 relative to the CIM 305 of the corresponding distribution hub 105. The SlotOff value is a value of SymCnt that corresponds to the start of the next slot, which is SLOT 0 in the first iteration. A slot number value "SlotNum" is set equal to one (1). The SlotNum value is an n-bit field representing all of the slots possible in a round robin cycle for n slots, with the Least Significant Bit (LSB) of the SlotNum variable representing the first slot, SLOT 0. For n=16 slots, the SlotNum value includes 16 bits, each bit representing a corresponding slot. A SlotNum value of one (1) denotes the first slot or SLOT 0. A reset count value "ResetCnt" is set to zero. The ResetCnt value is a timeout variable that halts slotting if a sync mark is not received or detected after a predetermined period of time.

From block 911, operation proceeds to block 913 at which the ResetCnt value is incremented (as denoted by "++" following the variable). Operation then proceeds to decision block 915 at which it is queried whether a sync mark has been received from the downstream. If not, operation proceeds to decision block 917 at which it is queried whether the ResetCnt value is greater than or equal to a predetermined maximum reset counter value "MaxResetCnt", which represents a maximum allowable value of ResetCnt. If ResetCnt has been incremented to be greater than or equal to MaxResetCnt as determined at block 917, operation proceeds to block 919 at which a loss of synchronization value "LossOfSync" is asserted denoting loss of synchronization between the downstream and upstream communications. As described previously, the upstream communication is synchronized based on the sync marks transmitted downstream. If synchronization is lost, then the slot timing procedure is terminated. Operation loops between blocks 913, 915 and 917 while the ResetCnt is less than MaxResetCnt as determined at block 917, or until a sync mark is received as determined at block 915.

Upon detection of a downstream sync mark 513 at block 915, operation proceeds to block 923 to increment the SymCnt value and then to block 925 representing a wait period of one symbol period. As described previously, a symbol period in an exemplary embodiment is approximately 390 ns. After a symbol period, operation proceeds to decision block 927 at which it is queried whether the SymCnt value has been incremented to be greater than or equal to the "RRDur" value. If so, then the current round robin period is completed and operation returns to block 911 to initialize variables for the next round robin period. Otherwise, operation proceeds to next decision block 929 at which it is queried whether the SymCnt value is greater than or equal to the SlotOff value. If not, operation returns to block 923 to increment the SymCnt value and to block 925 to wait another symbol period. Operation loops between blocks 923, 925, 927 and 929 until the beginning of the next slot, which is the first slot or SLOT 0 in the first iteration. Since this loop is initiated upon reception time of a sync mark 513 (at block 915) and since the SlotOff value was initially set equal to the transmit offset value TXOff, this loop initially operates to add TXOff to the reception time of a sync mark to determine the start of the first time slot of the current transmission window. Subsequent iterations of this loop are used to identify the beginning of each time slot in the transmission window.

When the SymCnt value is incremented to SlotOff denoting the beginning of the next slot, operation proceeds to block 931 at which the SlotDur value is added to the SlotOff value to effectively increment the SlotOff value to denote the beginning of the next slot in terms of symbol periods. Operation then proceeds to decision block 933 at which it is determined if the gateway 801 is able to transmit a burst in the current slot. Performing the logical AND operation between the SlotNum and SlotMask values and determining if the result is logically TRUE determine this. For example, if the current SlotNum value is logically TRUE in which the LSB of SlotNum is a TRUE logic value (such as a one in positive logic) and the remaining bits are FALSE (such as a zero in positive logic), and if the corresponding LSB of SlotMask is logically TRUE indicating that the gateway 801 is programmed to transmit during the first slot or SLOT 0, then the result of the AND operation is TRUE. If so, operation proceeds to block 935 at which a variable or signal is asserted by the sync mark detect and burst timing logic 817 to the burst transmitter 813 that the gateway 801 is authorized to transmit a burst of data during the current slot. The burst transmitter 813 begins transmitting the next burst of data. After the burst transmission is indicated at block 935, operation proceeds to block 937 at which the SlotNum value is left-shifted by one bit to thereby "increment" the SlotNum value to the denote the next slot, where the next slot is SLOT 1 during the first iteration. Referring back to block 933, if the result is instead FALSE indicating that the gateway 801 is not allowed to transmit during the current slot, then operation proceeds directly to block 937 to increment SlotNum to the next slot, and the burst transmission authorization is not indicated. After block 937, operation proceeds back to block 923 to increment the SymCnt value.

It is appreciated that operation loops between blocks 923–937 for each time slot during each round robin period or transmission window. Slot timing is controlled at blocks 923, 925 and 929 at which the SymCnt is regularly incremented and a wait of one symbol period is inserted until SymCnt is incremented to the beginning of the next time slot as indicated by the SlotOff value. The SlotOff value is then incremented by the SlotDur value at block 931 to indicate the start of the next slot. The SlotNum value is shifted or incremented for each slot and compared to the SlotMask value to determine whether the gateway 801 is authorized to transmit during the current slot as programmed by the SlotMask value. Operation proceeds in this manner until the SymCnt value is incremented to be equal to or greater than the RRDur value at block 927, at which time operation returns to block 911 to initialize the indicated variables for the next round robin time period. Operation continues indefinitely in this manner to transmit subscriber information in bursts to the corresponding CIM 305. A fixed-size codeword, described further below, is transmitted during each burst. Partially filled codewords may be padded with zeroes or null values to maintain codeword size for each burst. In one embodiment, burst transmissions by the gateway 801 are temporarily suspended while there is no subscriber data to be sent. Operation may still loop between blocks 913–937 to maintain synchronization. In an alternative embodiment, the gateway 801 transmits null valued codewords (e.g., filled with zeroes or null values or the like), during each burst in which subscriber data is not available for transmission to the CIM 305.

FIG. 10A is a block diagram illustrating packet encapsulation for upstream transmission performed by the communications processor 809. The communications processor 809 performs the PAP to generate a PAP frame 1001, in which a PAP header 1003 is appended to the front of the packet payload 1005 incorporating the subscriber-generated packet. This process is referred to as framing or encapsulation. In one embodiment, the PAP header 1003 includes a control field 1007 and a length field 1009. The control field 1007 further includes a packet type field 1011, an extended header field 1013, and a reserved field 1015. The length field 1009 specifies the number of bytes in the packet payload 1005. The PAP accomplishes inter-packet time fill by generating null packets with the type field 1011 set to null values or zero (0) bits. Moreover, the inter-pack time fill may further include the designation as a NULL PAP or PAP set to all zeros. Furthermore, the PAP may provide additional error correction by using simple parity on the PAP header 1003 with one of the reserved bits of the control field 1007.

In preparation for encoding, the communications processor 809 performs the CCP, which conducts a segmentation process by dividing the PAP frame 1001 into "N" segments 1017, 1019, . . . , 1021, where N is a positive integer and depends on the size of the PAP frame 1001, including the PAP header 1003 and the packet payload 1005. The PAP header 1003 is combined with a segment portion 1018 to form the first segment 1017. It is noted that N may be one (1) if the PAP frame 1001 is below a predetermined size and need not be divided for insertion into cells, as further described below. It is also noted that the total length of the PAP frame 1001 is not typically an integral multiple of some unit size so that when the PAP frame 1001 is divided into segments, at least one segment may be smaller (e.g., a remainder segment). A smaller segment may be made equivalent in size by padding it with zeroes or null values in preparation for the CCP. The segment size, however, may be fixed or variable depending upon the particular configuration. The CCP then attaches CCP headers 1023 to the beginning of each of the segments 1017–1021 to form corresponding CCP cells 1025, 1027, . . . , 1029. If another PAP frame is not immediately available for segmentation, then the remaining bytes of the smaller segment may be padded with zeroes or NULL values in preparation for the CCP. Otherwise, the segmentation process immediately begins the segmentation of the next PAP frame relative to the remaining bytes in the cell. If the channel, or sub-channel is receiving bursts or sustained PDU traffic, the segmentation process fully utilizes the available bandwidth by performing the segmentation of the PAP frame with respect to the available space in the cell.

In one embodiment employing (204, 188) RS encoding, each CCP cell is 188 bytes in length. The relative sizes of the CCP header 1023 and the remaining segment may vary, where each segment may be up to 187 bytes in length. Each CCP header 1023 includes a pointer offset field 1031 that identifies the beginning of the next PAP header. If the pointer offset value in the pointer offset field 1031 is within the appropriate range, the next packet begins in the current cell. In a configuration in which the remaining segment portions are 187 bytes in length, the appropriate range of the pointer offset value is 0 to 186, inclusive, for (204, 188) RS encoding. If the pointer offset value is equal to the maximum value of 204, thereby pointing to the following cell's CCP header, the next packet does not begin in the current CCP cell. Pointer offset values within the remaining range (187 to 203 inclusive) are considered invalid or are otherwise unused. It is noted that (255, 239) RS coding can be implemented, where the size of each CCP cell is 255 bytes so that the relative sizes of the payloads and fields are changed accordingly.

FIG. 10B is a block diagram of an upstream frame 1033 illustrating an exemplary upstream frame format. Further processing may be conducted on the CCP cells 1025–1029, such as scrambling or randomizing and the like, and the resulting data is encoded resulting in a frame payload 1035 and forward error correction (FEC) and short burst errors caused by noise during transmission. RS encoding uses redundancy in an efficient manner, expanding each cell by adding redundant data or symbols. It is noted that the FEC data 1037 is not necessarily a separate field but may be intermingled with the frame payload 1035. For (204, 188) RS encoding, the FEC data 1037 includes 16 parity or EDC bytes to achieve a (204, 188, 8) RS codeword. The FEC data for (204, 188, 8) RS encoding can correct eight erroneous bytes per RS codeword. A predetermined code generator polynomial and field generator polynomial are employed for the RS encoding process. It is noted that a shortened RS codeword (204 bytes) may be implemented by appending 51 bytes, all set to zero, before the information bytes at the input of a (255, 239) RS encoder. After the coding procedure, the appended bytes are discarded.

Following the encoding process, a convoluted interleaving scheme may optionally be applied resulting in interleaved frames (not shown). The burst transmitter 813, implemented according to QAM-16 modulation or QPSK, then modulates the resulting frames. The QAM process adapts the synchronous, scrambled bit-stream for transmission over a channel as RF output. The QAM process blocks together bits from the data stream and then maps them into codewords using either Gray codes or differential codes, or a combination of both. The QAM process then converts the resulting digital codewords into an analog waveform based on a constellation diagram of combinations of amplitudes and phases, where each unique bit sequence corresponds to a point in the constellation. The output of the burst transmitter 813 is provided to the RF circuitry 815, which converts the waveform into the appropriate format for assertion onto the subscriber medium link 108 via the diplexer 803.

Although the invention has been particularly shown and described with reference to several preferred embodiments thereof, it will be understood by those skilled in the art that various changes in form and details may be made therein without departing from the spirit and scope of the invention as defined in the appended claims.

We claim:

1. A method of providing dedicated upstream bandwidth to each of a plurality of subscriber locations for transmitting to a common point of distribution via an HFC network, comprising:

assigning, by the point of distribution, at least one of a predetermined number of time slots within each of repeating upstream transmission windows to each of the plurality of subscriber locations;

transmitting, by the point of distribution, a windowing signal to each of the subscriber locations;

encapsulating, by each subscriber location, subscriber data into data cells, each data cell suitable for a burst transmission within a time slot of predetermined duration;

determining, by each subscriber location, relative timing of each time slot within each of the repeating transmission windows based on the windowing signal and a predetermined transmit offset value; and burst transmitting, by each subscriber location, subscriber data cells within programmed time slots to the point of distribution.

2. The method of claim 1, wherein said transmitting a windowing signal comprises repeatedly transmitting a synchronization mark indicating a beginning of each transmission window.

3. The method of claim 2, wherein said determining relative timing comprises:

determining a receive time upon receiving a synchronization mark;

adding the transmit offset value to the receive time to identify a beginning time of a first time slot; and adding a predetermined time slot duration value to identify a beginning time of each subsequent time slot in each transmission window.

4. The method of claim 3, further comprising:

determining an end time of each transmission window based on a predetermined round robin duration value.

5. The method of claim 3, further comprising:

shifting a slot number bit field for each time slot within each transmission window; and comparing the slot number bit field with a predetermined slot mask field for each time slot to determine if burst transmission is allowed in that time slot.

6. The method of claim 1, wherein said transmitting a windowing signal comprises:

formulating downstream data into a stream of data cells;

inserting synchronization marks into selected data cells of the stream of data cells; and transmitting the stream of data cells to the subscriber locations in continuous mode.

7. The method of claim 1, wherein said encapsulating subscriber data into data cells comprises:

segmenting subscriber data into data segments;

framing each data segment into fixed-size frames; and encapsulating fixed-size frames into data cells.

8. The method of claim 7, further comprising prepending a predetermined preamble to each data cell.

9. The method of claim 1, further comprising:

measuring a propagation delay between the point of distribution and each subscriber location;

calculating a transmit offset value for each subscriber location; and sending a corresponding transmit offset value to each subscriber location.

10. The method of claim 9, further comprising:

determining a time slot duration value; and sending the time slot duration value to each subscriber location.

11. The method of claim 10, wherein said determining a time slot duration value comprises adding a suitable guard band.

12. The method of claim 11, further comprising:

adjusting, by the point of distribution, the time slot duration value to adjust the guard band between time slots.

13. The method of claim 1, further comprising:

said assigning at least one of a predetermined number of time slots comprising assigning at least one time slot to each subscriber location on a mutually-exclusive basis; and programming each subscriber location with a time slot assignment value.

14. A method of providing dedicated bandwidth to a subscriber location for transmitting to a point of distribution, comprising:

determining a propagation delay between the point of distribution and the subscriber location;

programming the subscriber location with a transmit timing offset based on the determined propagation delay;

programming the subscriber location with a subset of a predetermined number of time slots of repeating transmission windows of a frequency channel;

repeatedly transmitting a window synchronization signal to the subscriber location, the window synchronization signal indicating timing of the repeating transmission windows of the frequency channel;

calculating a start time of a first time slot of each transmission window based on when each window synchronization signal is received and the transmit timing offset;

determining a start time of each remaining time slot of each transmission window relative to the first time slot; and burst transmitting from the subscriber location only during a programmed subset of time slots of each transmission window.

15. The method of claim 14, wherein said determining a propagation delay comprises:

transmitting a calibrate message from the point of distribution to the subscriber location at a determinable time;

transmitting a burst communication from the subscriber location to the point of distribution upon detection of the calibrate message; and determining the time period between reception of the burst communication by the point of distribution and transmission of the calibrate message.

16. The method of claim 14, further comprising:

determining a start time for each transmission window relative to the point of distribution;

calculating a time differential between the transmission window start time and a reception time of the window synchronization signal at the subscriber location; and determining the transmit timing offset based on the calculated time differential.

17. The method of claim 14, further comprising:

determining a number of time slots per transmission window;

determining transmission duration of each time slot including transmission time of a subscriber location burst and a suitable guard band duration; and determining duration of each transmission window for transmitting the determined number of time slots including intermediate guard bands.

18. The method of claim 14, further comprising:

inserting a synchronization mark into selected codewords at the point of distribution so that each codeword with a synchronization mark is separated by a predetermined number of codewords without a synchronization mark; and transmitting the codewords by the point of distribution in continuous mode.

19. The method of claim 14, wherein said calculating a start time of a first time slot comprises:

determining a receive time of each window synchronization signal; and adding the transmit timing offset to the receive time.

20. The method of claim 14, further comprising:

determining a time slot duration value indicative of the duration of each time slot including a guard band; and programming the subscriber location with the time slot duration value.

21. The method of claim 20, wherein said determining a start time of each remaining time slot comprises adding the time slot duration value to a start time of a previous time slot start time beginning with the start time of a first time slot.

22. A communication system for providing dedicated bandwidth to at least one subscriber location for transmitting to a common point of distribution via an HFC network, comprising:

a channel interface module, located at the point of distribution, including a transmitter that transmits a windowing signal via the HFC network; and a gateway, located at a subscriber location and coupled to the point of distribution via the HFC network, comprising:

a processor that encapsulates subscriber data into data cells suitable for burst transmission;

receive logic that receives the windowing signal;

timing logic, coupled to the receive logic and the processor, that indicates burst transmission times only at programmed time slots within each of repeating transmission windows based on the windowing signal and a predetermined transmission timing offset; and a burst transmitter, coupled to the processor and timing logic, that burst transmits subscriber data cells in a predetermined upstream frequency channel when indicated by the timing logic.

23. The communication system of claim 22, wherein the channel interface module further comprises:

a burst receiver that detects burst transmissions from the gateway within a predetermined frequency channel; and a controller, coupled to the transmitter and the burst receiver, configured to conduct an initialization process for the gateway, the initialization process including instructing the transmitter to send hello messages in at least one predetermined time slot of a downstream frequency channel, periodically silencing the predetermined upstream frequency channel for at least a transmission window, detecting a burst response from the gateway in the predetermined upstream frequency channel and determining a propagation delay to the gateway.

24. The communication system of claim 23, wherein the controller is further configured to program the gateway with the transmission timing offset, a slot duration value and with a time slot assignment value.

25. The communication system of claim 22, wherein the transmitter of the channel interface module comprises:

a data processing engine that encapsulates downstream data into data cells;

an encoder, coupled to the data processing engine, that encodes data cells into codewords; and a modulator, coupled to the encoder, that modulates the codewords in continuous mode.

26. The communication system of claim 25, wherein the transmitter of the channel interface module is further configured to insert a synchronization mark into selected codewords to transmit a periodic windowing signal.

27. The communication system of claim 26, wherein the timing logic of the gateway includes a memory that stores a transmission timing offset value, a time slot assignment value, and a slot duration value.

28. The communication system of claim 27, wherein the timing logic of the gateway is configured to detect a synchronization mark, to add the transmission timing offset value to determine the start time of a first slot of each transmission window, to add the slot duration value to determine the start time of each subsequent slot of each transmission window, and to compare the time slot assignment value with each current slot to determine if burst transmission is allowed.

29. The communication system of claim 27, wherein the memory of the gateway timing logic further stores a transmission window duration value.

30. The communication system of claim 22, wherein the gateway processor is configured to segment subscriber data into data segments, to frame the data segments into frames and to encapsulate the frames into the data cells suitable for burst transmission.

31. A gateway configured to provide dedicated upstream bandwidth for transmitting to a point of distribution via an HFC network, the point of distribution transmitting a periodic synchronization signal to the gateway via the HFC within a predetermined downstream frequency channel, comprising:

a diplexer for coupling to the HFC;

receiver, coupled to the diplexer, that is tuned to the predetermined downstream frequency channel to receive communications from the point of distribution;

frame logic, coupled to the receiver, configured to resolve downstream transmitted codewords;

a communications processor, coupled to the frame logic, configured to convert subscriber data into data cells suitable for burst transmission;

a burst transmitter, coupled to the communications processor, configured to burst transmit a data cell from the communications processor within a predetermined time slot of a predetermined upstream frequency channel upon receiving a transmit signal;

timing logic, coupled to the frame logic, the communications processor and the burst transmitter, that is configured to detect the periodic synchronization signal from downstream codewords, to determine a start time for each time slot within the predetermined upstream frequency channel based on the synchronization signal, a timing offset value and a slot duration value, and to assert the transmit signal for each time slot indicated by a time slot assignment value; and a radio frequency (RF) circuit, coupled to the burst transmitter and the diplexer, that communicates burst transmissions to the point of distribution via the HFC network.

* * * * *